United States Patent
Nimmagadda et al.

(10) Patent No.: US 9,397,913 B1
(45) Date of Patent: Jul. 19, 2016

(54) PACKET LOSS MEASUREMENT IN A DISTRIBUTED DATA PLANE

(71) Applicant: Juniper Networks, Inc., Sunnyvale, CA (US)

(72) Inventors: Surya Nimmagadda, Cupertino, CA (US); Liang Zhang, Fremont, CA (US); Nitin Kumar, Fremont, CA (US); Sunanda Kommula, Cupertino, CA (US); Ramesh Kandula, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 162 days.

(21) Appl. No.: 14/228,771

(22) Filed: Mar. 28, 2014

(51) Int. Cl.
H04L 12/26 (2006.01)

(52) U.S. Cl.
CPC .................. H04L 43/0835 (2013.01)

(58) Field of Classification Search
CPC ............ H04L 12/4641; H04L 41/5009; H04L 43/0829; H04L 45/68
See application file for complete search history.

(56) References Cited

U.S. PATENT DOCUMENTS

| | | | |
|---|---|---|---|
| 6,502,001 B1 | 12/2002 | Kurono et al. | |
| 7,606,203 B1 | 10/2009 | Shabtay et al. | |
| 7,623,449 B2 | 11/2009 | Shabtay | |
| 7,990,993 B1 | 8/2011 | Ghosh et al. | |
| 8,014,317 B1 | 9/2011 | Ghosh et al. | |
| 8,339,959 B1 | 12/2012 | Moisand et al. | |
| 8,665,739 B2 | 3/2014 | Sampath et al. | |
| 2006/0002370 A1 | 1/2006 | Rabie et al. | |
| 2006/0285500 A1* | 12/2006 | Booth, III | H04L 41/5035 370/250 |
| 2007/0038798 A1 | 2/2007 | Bouchard et al. | |
| 2007/0263535 A1 | 11/2007 | Shabtay | |
| 2008/0044181 A1 | 2/2008 | Sindhu | |
| 2008/0080390 A1 | 4/2008 | Ebuchi et al. | |
| 2012/0076013 A1 | 3/2012 | Cheng | |
| 2013/0230050 A1 | 9/2013 | Mohan et al. | |

OTHER PUBLICATIONS

Bryant et al., "Pseudo Wire Emulation Edge-to-Edge (PWE3) Architecture," Networking Working Group, RFC 3985, Mar. 2005, 40 pp.
Harrington et al., "An Architecture for Describing Simple Network Management Protocol (SNMP) Management Frameworks," Networking Working Group, RFC 3411, Dec. 2002, 65 pp.

(Continued)

*Primary Examiner* — Siming Liu
(74) *Attorney, Agent, or Firm* — Shumaker & Sieffert, P.A.

(57) ABSTRACT

In general, techniques are described for performing packet loss measurement in a distributed data plane. In one example, a local router includes a plurality of forwarding units that implement a distributed data plane. First and second forwarding units may switch layer two (L2) packet data units (PDUs) between the local router and a remote router using a virtual path. The first and second forwarding may unit may increment, in response to processing any PDU of the PDUs for the virtual path, respective counters stored by the first and second forwarding units. The first and second forwarding units may update, based on the respective counters, a loss-measurement packet (LMP). For instance, the first forwarding unit, upon updating the LMP, may internally forward the LMP to the second forwarding unit. The second forwarding unit, upon updating the LMP, may send the LMP to the remote router.

27 Claims, 5 Drawing Sheets

(56) References Cited

OTHER PUBLICATIONS

ITU-T, "OAM functions and mechanisms for Ethernet based networks," ITU-T Y.1731, Telecommunications Standarization Sector of ITU, Series Y: Global Information Infrastructure, Internet Protocol Aspects and Next-Generation Networks, May 2006, 80 pp.

Lasserre et al., "Virtual Private LAN Service (VPLS) Using Label Distribution Protocol (LDP) Signaling," Network Working Group, RFC 4762, Jan. 2007, 32 pp.

Rosen et al., "MPLS Label Stack Encoding," Network Working Group, RFC 3032, Jan. 2001, 23 pp.

Ryoo et al., "OAM and its Performance Monitoring Mechanisms for Carrier Ethernet Transport Networks," IEEE Communications Magazine, IEEE Service Center Piscatawy, US, vol. 46(3), Mar. 1, 2008, 7 pp.

Zimmermann, "OSI Reference Model—The ISO Model of Architecture for Open Systems Interconnection," IEEE Transaction on Communications, vol. 28(4), Apr. 1980, pp. 425-432.

U.S. Appl. No. 13/042,059, by Prabakaran Thirumali Sampath, filed Mar. 7, 2011.

* cited by examiner

PACKET LOSS MEASUREMENT IN A DISTRIBUTED DATA PLANE

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

To monitor layer 2 (L2) performance metrics and verify operation, network administrators implement a process referred to as Operations, Administration and Maintenance (OAM), which generally provides the activities, tools, standards and other techniques that involve operating, administering and maintaining connectivity in the L2 computer network. Network devices may implement OAM processes to measure packet loss between two or more network devices.

SUMMARY

In general, techniques are described for performing packet loss measurement in a distributed data plane. For instance, a local router may send and receive L2 packet data units (PDUs) with a remote router. The local router may include a distributed data plane comprising multiple forwarding units, and the multiple forwarding units forward and receive network packets over multiple links that couple the local router to the remote router. The multiple links may be configured to operate as a single, logical link, such that PDUs sent and received between the local and remote routers are distributed across the different links. For example, multiple L2 links connected to different forwarding units may be configured at the local router as members of an L2 bundle, such as a link aggregation group (LAG), and installed to the local router routing information as an L3 network link. As another example, multiple L3 paths from the local router to the remote router may be configured at the local router as an equal-cost multipath (ECMP). Each L3 path of the ECMP may have an ingress interface at a different one of the forwarding units.

The local and remote routers may further establish a virtual path (e.g., an LSP or pseudowire operating over an LSP for instance) that includes the single, logical link, in which transport labels are applied to PDUs to provide various transport services to the PDUs while en route from source to destination. To determine the performance of the virtual path, the local router may perform packet loss measurement techniques (e.g., using OAM) to measure various metrics, such as throughout, latency, and packet loss.

Forwarding units associated with a virtual path may each separately store a counter for the virtual path to track a number of PDUs transmitted or received via the virtual path. The accumulation of the values for these separate counters represents a total counter value for the virtual path. For example, each forwarding unit may separately store a transmit and receive counter for a pseudowire having interfaces on multiple forwarding units. To perform packet loss measurement, when a forwarding unit forwards a PDU using a virtual path, the forwarding unit may increment its transmit counter associated with the virtual path. Likewise, when the forwarding unit receives a PDU using a virtual path, the forwarding unit may increment a receipt counter associated with the virtual path. Rather than using the control plane (or "slow path") of the local router or a single forwarding unit to separately poll and accumulate counter values from each forwarding unit associated with a virtual path, the local router may inject a loss-measurement packet (LMP) into its data plane (or "fast path"). The LMP may include one or more total counter values (e.g., a total transmit counter value and/or total receipt counter value) that, respectively, represent the total number of PDUs forwarded and received by the local router using the virtual path. Each forwarding unit associated with the virtual path adds its one or more individual counter values for the virtual path to the one or more respective total counter values included in the LMP. In this way, the LMP is updated by each forwarding unit with the number of PDUs forwarded and/or received via the virtual path by that forwarding unit. The forwarding units associated with the virtual path may each internally forward the LMP to another respective forwarding unit associated with the virtual path to update the respective total counter values.

Upon internally forwarding the LMP to each forwarding unit associated with the virtual path, the local router forwards the LMP to the remote router. The remote router may store one or more total counter values corresponding, respectively, to total PDUs forwarded and received by the remote router using the virtual path, in the LMP. The remote router may then forward the LMP back to the local router. Using the LMP stamped with one or more total counter values from the local and remote routers, the local router may perform packet loss measurement. For instance, the local router may determine a difference between total PDUs forwarded to the remote router and the total PDUs received by the remote router to determine the number of packets lost for the virtual path from the local router to the remote router. By injecting a LMP into the data plane to be internally forwarded by multiple forwarding units in order accumulate a total counter value based on separate counter values for the total counter stored by the forwarding unit, the local router may more quickly determine the total number of PDUs sent or received over a virtual path when using a distributed data plane. Because poll-based techniques centrally managed by a control plane for counter accumulation tend to have relatively-higher latency. The techniques described herein may also improve accuracy of the loss measurement, for high-speed internal forwarding and counter accumulation in the data plane may be completed with relatively little time for additional packets to be transmitted or received for the virtual path being measured. In addition, the techniques offload counter accumulation to the distributed data plane, which may reduce a processing burden on the control plane components of the local router.

In some examples, a method includes switching, with a local router having a plurality of forwarding units interconnected by a switch fabric to implement a distributed data plane, layer two (L2) packet data units (PDUs) between the local router and a remote router using a virtual path, wherein the virtual path includes first and second links that operate as a single logical link to transmit the PDUs between the local router and the remote router, and wherein the first and second links are coupled to different, respective first and second forwarding units of the plurality of forwarding units; incrementing, by the first forwarding unit and in response to the first forwarding unit processing any PDU of the PDUs for the virtual path, a first counter, stored by the first forwarding unit and associated with the virtual path; incrementing, by the second forwarding unit and in response to the second forwarding unit processing any PDU of the PDUs for the virtual path, a second counter, stored by the second forwarding unit and associated with the virtual path; updating, by the first forwarding unit and based at least in part on a value of the first counter, a loss-measurement packet (LMP); internally forwarding, by the first forwarding unit via the switch fabric, the LMP to the second forwarding unit; updating, by the second forwarding unit and based at least in part on a value of the second counter, the LMP; and sending, with the local router, the LMP to the remote router.

In some examples, a local router includes a least one processor; a plurality of forwarding units comprising interconnected by a switch fabric to implement a distributed data plane, the plurality of forwarding unit comprising a first forwarding unit and a second forwarding unit; wherein the first and second forwarding units switch layer two (L2) packet data units (PDUs) between the local router and a remote router using a virtual path, wherein the virtual path includes first and second links that operate as a single logical link to transmit the PDUs between the local router and the remote router, and wherein the first and second links are coupled to different, respective first and second forwarding units of the plurality of forwarding units; wherein the first forwarding unit increments, in response to the first forwarding unit processing any PDU of the PDUs for the virtual path, a first counter, stored by the first forwarding unit and associated with the virtual path; wherein the second forwarding unit increments, in response to the second forwarding unit processing any PDU of the PDUs for the virtual path, a second counter, stored by the second forwarding unit and associated with the virtual path; wherein the first forwarding unit updates, based at least in part on a value of the first counter, a loss-measurement packet (LMP); wherein the first forwarding unit internally forwards, via the switch fabric, the LMP to the second forwarding unit; wherein the second forwarding unit updates, based at least in part on a value of the second counter, the LMP; and wherein the second forwarding unit sends the LMP to the remote router.

In some examples, a non-transitory computer-readable medium comprising instructions that cause at least one processor of a local router to: switch, a plurality of forwarding units interconnected by a switch fabric to implement a distributed data plane, layer two (L2) packet data units (PDUs) between the local router and a remote router using a virtual path, wherein the virtual path includes first and second links that operate as a single logical link to transmit the PDUs between the local router and the remote router, and wherein the first and second links are coupled to different, respective first and second forwarding units of the plurality of forwarding units; increment, by the first forwarding unit and in response to the first forwarding unit processing any PDU of the PDUs for the virtual path, a first counter, stored by the first forwarding unit and associated with the virtual path; increment, by the second forwarding unit and in response to the second forwarding unit processing any PDU of the PDUs for the virtual path, a second counter, stored by the second forwarding unit and associated with the virtual path; update, by the first forwarding unit and based at least in part on a value of the first counter, a loss-measurement packet (LMP); internally forward, by the first forwarding unit via the switch fabric, the LMP to the second forwarding unit; update, by the second forwarding unit and based at least in part on a value of the second counter, the LMP; and send, with the local router, the LMP to the remote router.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
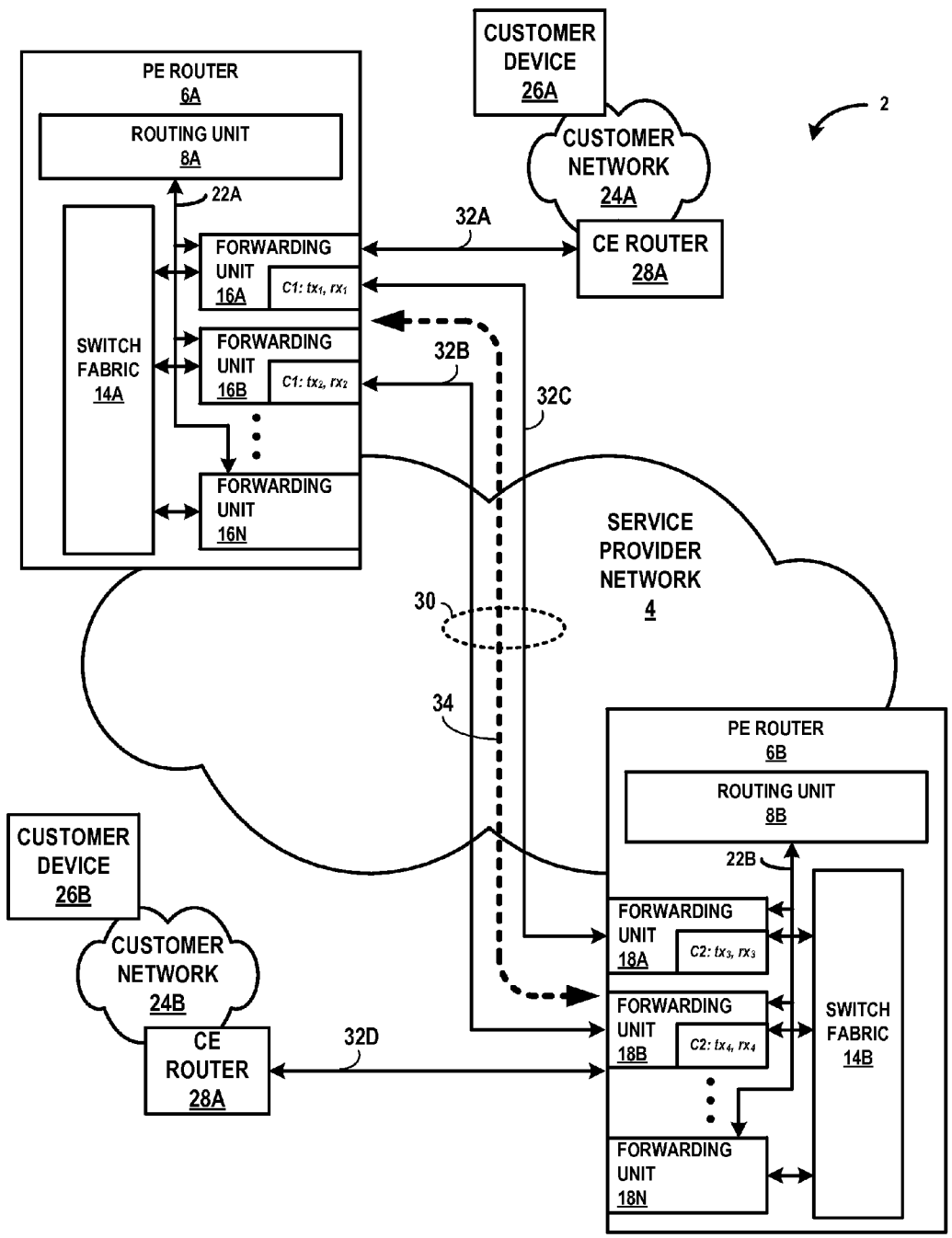
FIG. 1 is a block diagram illustrating an example system that includes a provider edge (PE) router that implements techniques for packet loss measurement in a distributed data plane, in accordance with techniques of the disclosure.

FIG. 1 is a block diagram illustrating an example system that includes a provider edge router that implements techniques for packet loss measurement in a distributed data plane, in accordance with techniques of the disclosure. As shown in FIG. 1, system 2 includes service provider network 4 and customer networks 24A-24B ("customer networks 24"). Service provider network 4 may comprise the Internet or other network. In some cases, service provider network 4 may comprise a multi-protocol label switching (MPLS) network.

Service provider network 4 may represent a public network that is owned and operated by a service provider or a set of cooperating service providers to interconnect a plurality of edge networks, such as customer networks 24. As a result, service provider network 4 may be referred to herein as a "core network" in that service provider network 4 may act as a core to interconnect other SP networks or edge networks, such as customer networks 24. Example service providers include Verizon Communications Inc. or American Telephone & Telegraph (AT&T™) Company.

The service providers may lease portions of service provider network 4 or provide bridging (or switching) services offering interconnection through service provider network 4 to customer networks 24, which may lease the portions or purchase the services provided by service provider network 4. In some examples, service providers may lease portions of service provider network 4 to create a Layer 2 Virtual Private Network (L2VPN) interconnecting the various layer 2 (L2) customer service provider network 4. The bridging service may be, for example, an L2VPN, a Virtual Private Local Area Network (LAN) Service (VPLS), or a virtual leased line (VLL). Reference to layers followed by a numeral, such as L2, may refer to a particular layer of the Open Systems Interconnection (OSI) model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein.

Each of customer networks 24 may include a local area network (LAN) or a wide area network (WAN) having customer devices 26A, 26B ("customer devices 26), which may represent nodes, web servers, print servers, application servers, data servers, workstations, desktop computers, laptop computers, cellular or other mobile devices, Personal Digital Assistants (PDAs), and any other device cable of connecting to a computer network via a wireless and/or wired connection. In some instances, a single large entity may own and operate two or more of customer networks 24. The entity may then contract with one or more service providers of service provider network 4 to purchase a service, such as a VPLS instance, in order to transparently interconnect customer networks 24.

Each of customer networks 24 may operate according to a wide variety of network protocols, such as any of the 802.3X family of network protocols related to the Ethernet protocol, any of the 802.1X family of wireless networking protocols, an Internet Protocol (IP) protocol, and a Transmission Control Protocol (TCP). Moreover, one or more of VPLS sites 14 may comprise a Virtual Private Network (VPN), a Large Area Network (LAN), or a Wide Area Network (WAN).

Devices on customer networks 24A, 24B and service provider network 4 may be operatively coupled by links. Links may be wired or wireless links that provide for the transmission of network traffic between devices. As shown in FIG. 1, system 2 includes links 32A-32D. Each of links 32A-32D may provide, as non-limiting examples, a 10- or 100-gigabit, physical connection.

As shown in FIG. 1, service provider network 4 includes provider edge (PE) routers 6A-6B ("PE routers 6"). Each of PE routers 6 couples to one or more of customer networks 24 via customer edge (CE) devices 28A-28B ("CE devices 28"). For example, PE router 6A is coupled to customer network 24A via CE device 28A (e.g., a router or switch). PE router 6B is coupled to customer network 24B via CE device 28B.

PE routers 6A-6B may reside at an edge of service provider network 4. While discussed herein with respect to a particular network device, i.e., a router, PE routers 6 may each represent any network device that interfaces with a network, such as one of customer networks 24, to route, switch, bridge or otherwise forward network traffic directed to or originating from the network. For example, PEs routers 6 may each represent, in certain instances, one or more of a switch, a hub, a bridge device (e.g., an Ethernet bridge), or any other L2 network device and, in some instances, L3 network devices capable of performing L2 functionality.

Each of customer networks 24 may also include a respective one of a plurality of customer edge (CE) routers 28A-28B ("CE routers 28") that reside at an edge of the corresponding one of customer networks 24. Like PE routers 6, CE routers 28, while discussed herein with respect to a particular network device, i.e., a router, may each represent any network device that interfaces with a network, such as service provider network 4, to bridge, switch or otherwise forward network traffic directed to or originating from the network. For example, CE routers 28 may each represent, in certain instances, one or more of a switch, a hub, a bridge device (e.g., an Ethernet bridge), or any other L2 network device and, in some instances, L3 network devices capable of performing L2 functionality.

PE routers 6 may provide one or more services, such as the above described VPLS instance, to transparently interconnect CE routers 28 to one another. For instance, a large entity may own and operate each of customer networks 24 and purchase from the service provider a VPLS instance to transparently interconnect each of these CEs routers 28 to one another via service provider network 4. In some instances, one or more of CE routers 28 may comprise or otherwise operate as a L2 bridge between associated customer networks 24 and connected PE routers 6. In such instances, the VPLS instance "learns" multiple source L2 addresses of additional devices within the customer networks 24 from the bridging CE routers 28.

FIG. 1 illustrates further details of PE routers 6A and 6B. Although further details of components included in PE routers 6A and 6B are described with respect to PE router 6A, such descriptions are also applicable to like-named components of PE router 6B. PE router 6A includes routing unit 8A, switch fabric 14A, and forwarding units 16A-16N ("forwarding units 16"). Forwarding units 16 may receive and send data via interface cards (further illustrated in FIG. 2). Switch fabric 14A provides an interconnect mechanism for forwarding data between forwarding units 16 for transmission over a network, e.g., the Internet.

Routing unit 8A maintains routing tables, executes routing protocol and controls user access to PE router 6A. In this example, routing unit 8A is connected to each of forwarding units 16 by a dedicated link 22A, which may be an internal Ethernet link. For example, dedicated link 22A may comprise a 100 Mbps Ethernet connection. Routing unit 8A maintains routing information that describes a topology of a network, and derives a forwarding information base (FIB) in accordance with the routing information.

Routing unit 8A includes an environment for storing L2 network topology information, e.g., spanning tree information, executing CFM protocols to provide fault isolation and detection over large L2 networks, and providing a management interface to allow user access and configuration of PE router 6A. The operating environment of routing unit 8A may be implemented solely in software, or hardware, or may be implemented as a combination of software, hardware or firmware. For example, routing unit 8A may include one or more processors which execute software instructions. In that case, routing unit 8A may include various software modules or daemons, and may include a computer-readable storage medium, such as computer memory or hard disk, for storing executable instructions.

In a routing node, a "switch plane" is generally capable of providing a communication path between any two of forwarding units 16. Switch fabric 14A may consist of multiple standalone switch planes. In some embodiments, each of the switch planes is provided by one or more switch fabric chips on one or more separate, removable switch cards. Other routing nodes that implement the techniques described herein may comprise additional or fewer switch planes, including a single switch plane. Each switch plane may form a standalone switch fabric that enables packet forwarding between forwarding units of PE router 6A.

PE router 6A includes a decentralized data or forwarding plane in that packet processing/forwarding functionality is distributed among a plurality of forwarding units 16. Forwarding units 16 internally forward data traffic among one another from ingress interfaces for the data traffic to egress interfaces for the traffic. Each of forwarding units 16 includes hardware or a combination of hardware and software that forwards data traffic, in accordance with forwarding information. One or more physical interface cards (PICs) together with one or more packet processors reside on each of forwarding units 16, which may be insertable within the PE router 6A chassis. Each of forwarding units 16 thus presents a network interface for sending and receiving subscriber data traffic and also includes packet processing capabilities to enable subscriber data packet processing with respect to subscriber sessions to perform aspects of wireless access gateway functionality.

PE router 6B includes routing unit 8B, switch fabric 14B, and forwarding units 18A-18N ("forwarding units 18"). Forwarding units 18 may receive and send PDUs via interface cards. In some examples, the term PDU may be used interchangeably with packet. Switch fabric 14B provides an interconnect mechanism for forwarding data between forwarding units 18 for transmission over a network, e.g., service provider network 4. PE router 6B also includes routing unit 8B. As described above, components illustrated in PE router 6B may be the same or include similar functionality to like-named components as described in PE router 6A.

As shown in FIG. 1, PE routers 6A and 6B may implement a virtual network, such as an L2VPN or more specifically a VPLS. Although described with respect to L2VPNs, techniques of the disclosure may be applicable to any such virtual network. By utilizing MPLS protocols, such as the Label Distribution protocol (LDP) or the Resource Reservation Protocol with Traffic Engineering extensions (RSVP-TE), PE routers 6A and 6B forward traffic along a particular, virtual path 34 for the virtual network through service provider network 4 to a destination device. Virtual path 34, in the example of FIG. 1, may be a LSP. In some examples, labels are prepended to the traffic. VP 34 defines a distinct path through the network to carry MPLS packets from the source device to a destination. Using a MPLS protocol, each of PE routers 6A and 6B that utilize VP 34 allocates a label in association with the destination and propagates the label to the closest upstream router along the VP 34. PE routers 6A and 6B along VP 34 add or remove the labels and perform other MPLS operations to forward the MPLS packets along the established path.

As shown in FIG. 1, VP 34 may be configured to use to multiple links 32B-32C, such that links 32B, 32C operate as a single logical link 30 to carry MPLS PDUs between PE router 6A and 6B. For example, PE routers 6A and 6B may each run a layer 2, multi-link protocol such Link Aggregation Control Protocol (LACP) as defined in IEEE 802.1AX-2008, and/or may each apply Equal-Cost Multi-Path (ECMP) routing as defined in IEEE 802.1Qbp. In the example of FIG. 1, links 32B-32C may appear as a single logical link 30 or Link Aggregation Group (LAG)/ECMP to PE routers 6A. In such examples, links 32B and 32C may be coupled to different forwarding units within each respective network device. For instance, forwarding units 16A and 18A may be coupled using network link 32C, and forwarding units 16B and 18B may be coupled using network link 32B. Although illustrated as each extending from PE router 6A to PE router 6B, links 32B-32C may in some instances couple to respective forwarding units 16A, 16B yet converge at an intermediate router (not shown) of service provider network 4, in which case additional links of service provider network 4 transport VP 34 between the intermediate router and PE router 6B.

When sending network traffic to PE router 6B using VP 34, PE router 6A may forward PDUs with both forwarding units 16A and 16B. That is, PE router 10A may forward network PDUs on logical link 30 using both of links 32B and 32C. In such examples, forwarding network PDUs on multiple links may load-balance network flows or individual packets of a network flow and improve overall performance. Although single logical link 30 is illustrated in FIG. 1 as including 32B-32C for example purposes, other links may also be included in single logical link 30. For instance, in the example of FIG. 2, network link 90A is also included in single logical link 30 for example purposes.

To monitor performance of network traffic sent on VP 34 across multiple links, PE routers 6A and 6B may perform loss measurement. For example, PE routers 6A, 6B may implement OAM. In the example of FIG. 1, PE routers 6A and 6B may implement MPLS-OAM. Using MPLS-OAM, PE routers 6A and 6B each respectively monitor PDUs sent and received by links 32B-2C that are each associated with VP 34. To monitor the links, forwarding units of PE routers 6A and 6B each maintain respective counters for the number of PDUs that the network link has transmitted and received for VP 34 at the respective PE router. For example, forwarding units 16A and 16B of PE router 6A monitor links 32B and 32C, respectively, for VP 34. Each of forwarding units 16A-16B includes a respective pair of transmit/receipt counters that are associated with VP 34. For VP 34, forwarding unit 16A maintains transmit counter $tx_1$ and receipt counter $rx_1$, and forwarding unit 16B maintains transmit counter $tx_2$ and receipt counter $rx_2$ To associate each of the counters with VP 34, PE router 6A may associate a counter identifier for the VP 34 with the respective counters. In the example of FIG. 1, PE router 6A associates a counter identifier C1 with each of transmit counter $tx_1$, receipt counter $rx_1$, transmit counter $tx_2$ and receipt counter $rx_2$ PE router 6A may define an association between counter identifier C1 and an identifier of VP 34. PE router 6A may further maintain information that indicates an association between VP 34 and logical link 30, which comprises links 32B and 32C. Based on the association between VP 34 and logical link 30, and the association between VP 34 and counter identifier C1, PE router 6A may determine that transmit counter $tx_1$, receipt counter $rx_1$, transmit counter $tx_2$ and receipt counter $rx_2$ are collectively used to monitor network traffic for VP 34. In some examples, a counter may be implemented in hardware, software, or a combination of hardware and software. A forwarding unit 16 may increment a counter in response to, for example, sending a PDU or receiving a PDU that satisfies a particular criterion. For example, the criterion may specify a particular LSP label or pseudowire service label such that the forwarding unit 16 only increments the counter if the PDU includes the particular LSP label or pseudowire service label.

In the example of FIG. 1, when forwarding unit 16A transmits a PDU over network link 32C using VP 34, forwarding unit 16A increments transmit counter transmit counter $tx_1$. For instance, when forwarding unit 16A forwards the PDU on VP 34, forwarding unit 16A may perform a lookup, based on an identifier of VP 34, to select counter C1 (associated with VP 34) and increment $tx_1$ associated with C1. Similarly, when forwarding unit 16A receives a PDU over network link 32C using forwarding over VP 34, forwarding unit 16A increments a receipt counter $rx_1$. In the same way, when forwarding unit 16B transmits a PDU over network link 32B using VP 34, forwarding unit 16B increments transmit counter $tx_2$. When forwarding unit 16B receives a PDU over network link 32B using VP 34, forwarding unit 18A increments a receipt counter $rx_2$. In this way, forwarding units 16A-16B track the number of PDUs transmitted and received by PE router 6A for VP 34. PE router 6B may, in the same as described with respect to PE router 6A, maintain transmit counter $tx_3$, receipt counter $rx_3$, transmit counter $tx_4$ and receipt counter $rx_4$ Each of the respective counters may be associated with counter identifier C2. PE router 6B may maintain an association between VP 34 and counter identifier C2. As PDUs are sent and received by PE router 6B on VP 34, PE router 6B may increment the respective counters in the same way as described with respect to PE router 6A.

PE routers 6A and 6B may compute packet loss for VP 34 by determining the difference between the sum of transmit counters for VP 34 at an ingress endpoint and the sum of the receipt counters for VP 34 at an egress endpoint. PE routers 6A and 6B, at corresponding endpoints of logical link 30, perform service packet loss measurement by exchanging counter data in one or more control messages to enable one of PE routers 6A and 6B to compute the difference between the transmit counter and receipt counter for each direction of the service link.

To illustrate PE router 6A performing service packet loss measurement for VP 34 by exchanging counter data, PE router 6A may initially send PE router 6B a LMP identifying VP 34 that includes the sum of transmit counters $tx_1+tx_2$ and the sum of receipt counters $rx_1+rx_2$. In response to determining that the loss-measurement packet identifies VP 34, PE router 6B may send PE router 6A the LMP with additional values that indicate, respectively, the sum of transmit counters $tx_3+tx_4$ and the sum of receipt counters $rx_3+rx_4$. PE router 6A may compute packet loss for VP 34 as the difference between the sum of $tx_1+tx_2$ and the sum of $rx_3+rx_4$, where packet loss refers to the number of PDUs sent by PE router 6A over VP 34 but not received by PE router 6B.

PE routers 6A and 6B may periodically, or under direction by an administrator, request performance data for particular VPs including packet loss data such as for VP 34. PE routers 6A and 6B perform the packet loss measurement techniques to provide packet loss data for VP 34 responsive to the requests or, in some instances, periodically or upon occurrence of a defined event. PE routers 6A and 6B may determine, in addition to packet loss measurements for VP 34, the appropriate transmit and receipt counter data for one or more of PE routers 6A and 6B to compute a packet loss ratio.

As illustrated from the description above of FIG. 1, when PDUs are transmitted or received on a VP over a multi-link LAG bundle or using ECMP, the transmit and receipt counters are distributed across multiple forwarding units. When a router performs packet loss measurement for a particular VP, the respective transmit and receipt counters associated with the VP from each forwarding unit are needed to determine the total number of PDUs sent on the VP and the total number of PDUs received on VP. As described above, the total number of PDUs sent and received may be stamped in a LMP that is sent to another router in the MPLS network. Although each respective counter value for a particular VP may be fetched by a control plane of the router, such techniques may be characterized by excessive wait times during the fetching, which can potentially result in stale and/or undeterministic counter values. Such wait times may lead to deviations from the actual counters, which may be unreliable. Alternatively, using a single forwarding unit to accumulate counter values from all other forwarding units associated with the VP may similarly suffer from such limitations as described with respect to fetching counters using the control plane. Apart from accuracy, both techniques—using a control plane to poll each forwarding unit and using a single forwarding unit that accumulates counter values from all other forwarding units—may not scale well in terms of the number of virtual paths or the number of forwarding engines across which the counters are distributed.

Rather than using a using a control plane to poll each forwarding unit for counter values or using a single forwarding unit that accumulates counter values from all other forwarding units, techniques of the disclosure may include injecting a LMP into the data plane of PE router 6A that will be internally forwarded through each of forwarding units 16A-16B associated with VP 34, one at a time, to perform an indicated operation at each forwarding unit. The indicated operation may collect one or more specified counter values for VP 34 that are maintained at the forwarding units for the VP. Upon completion of traversing each of forwarding units 16A-16B associated with the VP, the LMP is forwarded to a next hop router, such as PE router 6B. The next hop router may stamp counter values for the VP in the LMP and send the LMP back to PE router 6A. As described above, PE router 6A may perform packet loss measurement by determining the difference between the number of PDUs transmitted by PE router 6A on VP 34 to PE router 6B and the number of PDUs received from PE router 6A on VP 34 by PE router 6B. Techniques of the disclosure are now further described with respect to FIG. 1.

Initially, routing unit 8A may configure forwarding units 16A-16B to forward PDUs using VP 34, over links 32B and 32C. To forward PDUs over links 32B and 32C, routing unit 8A may configure links 32B and 32C in a LAG. In particular, routing unit 8A may determine physical interfaces of forwarding units 16A and 16B that are coupled to links 32B and 32C, and configure the physical interfaces in a LAG to operate collectively as logical link 30. Routing unit 8A may further associate logical link 30 with VP 34. Specifically, routing unit 8A may configure each of forwarding units 16A and 16B to, when forwarding a PDU using VP 34, use logical link 30, which includes links 32B and 32C.

In accordance with techniques of the disclosure, routing unit 8A may perform setup of counter identifiers in one or more forwarding units. Routing unit 8A may set up counter identifiers responsive to configuring forwarding units 16A-16B to forward and receive PDUs using VP 34. For instance, routing unit 8A may define a counter identifier C1 associated with VP 34, as illustrated in FIG. 1. In some examples, routing unit 8A may maintain a lookup table to store associations between counter identifiers and VPs.

Routing unit 8A may configure each of forwarding units 16A-16B to associate a transmit counter and/or receipt counter with VP 34 using counter identifier C1. For example, routing unit 8A may configure forwarding unit 16A to use transmit counter $tx_1$ to count PDUs forwarded on VP 34 by forwarding unit 16A. Forwarding unit 16A may associate transmit counter $tx_1$ with counter identifier C1. Similarly, routing unit 8A may configure forwarding unit 16A to use receipt counter $rx_1$ to count PDUs received on VP 34 by forwarding unit 16A. Forwarding unit 16A may associate transmit counter $rx_1$ with counter identifier C1. Routing unit 8A may configure forwarding unit 16A to maintain a lookup table between an identifier of VP 34 and counter identifier C1. In this way, when forwarding unit 16A forwards a PDU using VP 34, forwarding unit 16A may look up counter C1 based on the identifier of VP 34 and increment counter $tx_1$. Similarly, when forwarding unit 16A receives a PDU using VP 34, forwarding unit 16A may lookup counter C1 based on the identifier of VP 34 and increment counter $rx_1$. In this way, counter identifier C1 identifies at least one respective counter of each respective forwarding unit that is associated with VP 34.

Routing unit 8A may configure forwarding unit 16B to use transmit counter $tx_2$ to count PDUs forwarded on VP 34 by forwarding unit 16B. Forwarding unit 16B may associate transmit counter $tx_2$ with counter identifier C1. Similarly, routing unit 8A may configure forwarding unit 16B to use receipt counter $rx_2$ to count PDUs received on VP 34 by forwarding unit 16B. Forwarding unit 16B may associate transmit counter $rx_2$ with counter identifier C1. Routing unit 8A may configure forwarding unit 16B to maintain a lookup table between an identifier of VP 34 and counter identifier C1. In this way, when forwarding unit 16B forwards a PDU using VP 34, forwarding unit 16B may look up counter C1 based on the identifier of VP 34 and increment counter $tx_2$. Similarly, when forwarding unit 16B receives a PDU using VP 34, forwarding unit 16B may look up counter C1 based on the identifier of VP 34 and increment counter $rx_2$.

In the example of FIG. 1, PE router 6A (e.g., a "local router") may switch L2 PDUs with PE router 6B (e.g., a "remote router") using an L2 virtual path, e.g., VP 34. In some examples, switching PDUs may refer to receiving a PDU, performing a lookup to determine the destination of the PDU, and forwarding the PDU to the destination. As shown in FIG. 1, VP 34 uses a plurality of links 32B and 32C that operate as a single logical link 30 to transmit the PDUs between PE router 6A and PE router 6B. In the example of FIG. 1, at least two of the plurality of links, e.g., links 32B and 32C, are coupled to different, respective forwarding units 16A, 16B of forwarding units included in PE router 6A.

As PE router 6A receives and forwards PDUs for VP 34, forwarding units 16A-16B increment counters $tx_1$, $rx_1$ and $tx_2$, $rx_2$, accordingly. That is, forwarding units 16A-16B may increment respective transmit counters associated with a respective forwarding units, responsive to the respective forwarding unit processing a PDU for the L2 virtual path using one of the plurality of links. In some examples, processing the PDU may include forwarding the PDU or receiving the PDU, in which the forwarding unit increments the respective counter based on whether the PDU is forwarded or received.

In accordance with techniques of the disclosure, routing unit 8A may initiate a packet loss measurement based on input from an administrator or as an automated or scheduled process. PE router 6A may initially generate a loss-measurement packet (LMP). In the example of FIG. 1, the LMP may include an MPLS-OAM packet. In other examples, the LMP may be but is not limited to an OAM packet. As further described in FIGS. 2-3, PE router 6A may append an internal header to the LMP. The internal header may indicate one or more forwarding units that are associated with the virtual path. The internal header may include an opcode that indicates a specified operation to be performed by a forwarding unit. For instance, the opcode, when processed by a forwarding unit, may cause the forwarding unit to update a total counter value included in an LMP with a counter value. In particular, the specified operation may determine a counter identifier indicated in the internal header. The operation may add the corresponding counter value maintained by the forwarding unit to a total counter value stored in the LMP. The total counter value stored in the LMP may correspond to the total number of PDUs forwarded on a particular VP by a PE router, or the total number of PDUs received by a PE router using a particular VP. The LMP may include multiple total counter values, for instance, a total number of PDUs sent using VP 34 and a total number of PDUs received using VP 34.

The internal header of the LMP may also include the counter identifier that identifies a particular VP. In the example of FIG. 1, the counter identifier may be C1 that is associated with VP 34. Therefore, the counter identifier C1 may be included in the internal header of the LMP. The internal header of the LMP may also include a data structure that indicates each of the plurality of forwarding units associated with VP 34 that are included in PE router 6A. The data structure may also indicate forwarding units not associated with VP 34. In some examples, the data structure may be a map, list, bitmap, etc. In the example of FIG. 1, the data structure may be a mask implemented as a bitmap. Each bit of the mask may correspond to a different forwarding unit in PE router 6A. In some examples, routing unit 8A may maintain information that associates each bit index with a different forwarding unit. For each bit index that corresponds to a forwarding unit associated with VP 34, the bit may be set to '1'. For each bit index that corresponds to a forwarding unit that is not associated with VP 34, the bit may be set to '0'. To set the bits, routing unit 8A may use a lookup table that includes associations between identifiers of VPs and identifiers of forwarding units. Based on an identifier of VP 34, routing unit 8A may set bits in the mask corresponding to forwarding units 16A and 16B to '1', while the remaining bits may be '0' for other forwarding units not associated with LSP 34. As described in this disclosure, each respective forwarding unit associated with VP 34 may use the mask to internally forward the LMP to the next forwarding unit associated with VP 34.

The internal header of the LMP may also include a next hop identifier for the PE router to which PE router 6A will forward the LMP after internally traversing one or more forwarding units associated with VP 34. In the example of FIG. 1, the next hop identifier may identify PE router 6B. Examples of the next hop identifier may include an IP address, MAC address, or any other suitable identifier.

Upon generating the LMP with the appended internal header, routing unit 8A may inject the LMP forwarding unit 16A because forwarding unit 16A forwards and receives PDUs using VP 34. Responsive to receiving the LMP, forwarding unit 16A determines that opcode included in the internal header. Based on the opcode, forwarding unit 16A may fetch one or more instructions to update one or more total counter values included in the LMP. In some examples, techniques of the disclosure may support multiple different opcodes. For instance, a first opcode may cause a forwarding engine to update the LMP with both transmit counter and receipt counter values. A second opcode may cause a forwarding engine to update the LMP with only the transmit counter, while a third opcode may cause a forwarding engine to update the LMP with only the receipt counter. Routing unit 8A may set the opcode in the LMP, based on administer configuration and/or automatically by one or more processes.

Forwarding unit 16A may update the LMP, based at least in part on one or more counter values identified by counter identifier C1, where C1 is associated with forwarding unit 16A. In some examples, to update the LMP, forwarding unit 16A, based on the opcode, determines the counter identifier C1 included in the internal header. Forwarding unit 16A performs a lookup in a lookup table for counters associated with counter identifier C1. Based on the lookup, forwarding unit 16A determines that counters $tx_1$, $rx_1$ are associated with counter identifier C1. Forwarding unit 16A may add the value of counter $tx_1$ to the total transmit counter value in the LMP. Forwarding unit 16A may add the value of counter $rx_1$ to the total receipt counter value in the LMP. In some examples, the respective total counter values are initialized to zero by routing unit 8A before sending to any of the forwarding units associated with VP 34.

Upon updating the LMP based on counters associated with counter identifier C1, forwarding unit 16A may determine the bit index in the mask of the internal header for the LMP. In some examples, forwarding unit 16A may maintain a lookup table between bit indexes and forwarding units based on information received from routing unit 8A. Forwarding unit 16A may set the value from '1' to '0' for the determined bit index that corresponds to forwarding unit 16A. That is, forwarding unit 16A may modify the data structure, e.g., mask, to indicate that forwarding unit 16A does not need to later update the LMP. That is because forwarding unit 16A has updated the LMP, forwarding unit 16A may not later update LMP again before it is forwarded to PE router 6B.

Forwarding unit 16A may forward the LMP to one or more remaining forwarding units of PE router 16A that are associated with VP 34. Each respective remaining forwarding unit may update the LMP based on a respective counter associated with the respective remaining forwarding unit. For instance, forwarding unit 16A may determine that the bit in the mask corresponding to forwarding unit 16B is set to '1'. That is, forwarding unit 16B may determine, based on the data structure, e.g., mask, whether one or more of the remaining forwarding units that are associated with VP 34 have updated the LMP. For instance, forwarding unit 16B may determine whether any remaining forwarding units with the virtual path need to update the LMP. Forwarding unit 16A may internally forward the LMP across switch fabric 14A to forwarding unit 16B based on the bit corresponding to forwarding unit 16B being '1'. For instance, responsive to determining, based on the data structure, that one or more of the remaining forwarding units associated with VP 34 have not updated the LMP, forwarding unit 16A may determine at least one remaining forwarding unit associated with VP 34 that has not updated the LMP and internally forward, using a switch fabric 14A, the LMP to the at least one remaining forwarding unit.

Forwarding unit 16B may similarly update the total transmit counter value and total receipt counter value based on respective counters $tx_2$ and $rx_2$ that are each identified by counter identifier C1. For instance, forwarding unit 16B may add the value of $tx_2$ to the total transmit counter value and $rx_2$ to the total receipt counter value. In accordance with techniques of the disclosure, each forwarding engine associated with VP 34 may similarly internally forward the LMP based on the mask, update one or more total counter values in the LMP based on the counter identifier, update the mask, and forward the LMP to the next forwarding engine associated with VP 34.

In the example of FIG. 1, forwarding units 16A-16B may be the only two forwarding units associated that forward and receive PDUs using VP 34. Consequently, forwarding unit 16B may determine, based on the mask, that the LMP has internally traversed each forwarding unit associated with VP 34. Forwarding unit 16B may forward the LMP, using the nexthop specified in the internal header, to PE router 6B.

PE router 6B may stamp the LMP with counter values associated with VP 34. For instance, PE router 6B may update the LMP based on counters $tx_3$, $rx_3$, $tx_4$, and $rx_4$, which are each associated with counter identifier C2. Counter identifier C2 may be associated with VP 34. In some examples, PE router 6B may update the LMP in the same way as described with respect to PE router 6A above. In other examples, the control plane of PE router 6B (e.g., including routing engine 12B) may poll each forwarding unit for the respective counter values and update the LMP. In other examples, PE router 6B may use a single forwarding unit to accumulate counter values from all other forwarding units associated with VP 34. In any case, PE router 6B may store the total number of PDUs received by PE router 6B for VP 34 and/or the total number of PDUs forwarded by PE router 6B for VP 34. PE router 6B may forward the LMP back to PE router 6A. Although as shown in FIG. 1 with a distributed data plane, PE router 6B, in some examples, may include a single rx/tx counter set. That is, PE router 6B may not include a distributed data plane.

In the example of FIG. 1, routing unit 8A may receive the LMP. To perform a packet loss measurement for VP 34, routing unit 8A may determine a difference between the total number of PDUs forwarded by PE router 6A to PE router 6B using VP 34 and the total number of PDUs received by PE router 6B from PE router 6A using VP 34. From the LMP, routing unit 8A may select the total transmit counter value stamped by PE router 6A that comprises the sum of $tx_1$ and $tx_2$, and may also select the total receipt counter value stamped by PE router 6B that comprises the sum of $rx_3$ and $rx_4$. The difference between the total transmit counter stamped by PE router 6A for VP 34 and the total receipt counter value stamped by PE router 6B for VP 34 indicates the number of PDUs that were lost when forwarding the PDUs from PE router 6A to PE router 6B using VP 34.

In some examples, an LMP, as described above, may be a loss measurement message (LMM) or a loss measurement reply (LMR) as referred to in the Internal Telecommunication Union Telecommunication Standardization Section (ITU-T) recommendation Y.1731, "OAM functions and mechanisms for Ethernet based networks," May, 2006, which is incorporated by reference herein in its entirety. Maintenance entities (MEs), as described for example in ITU-T Y.1731 incorporated above, refer to a single point-to-point (P2P) Ethernet connection, such as that provided at the customer-facing interfaces of a virtual circuit to implement a P2P L2VPN. A multipoint-to-multipoint (MP2MP) Ethernet connection, such as that provided by a VPLS over a service provider network, includes a number of maintenance entities that each represents a P2P Ethernet connection within the MP2MP Ethernet connection. Each ME in an MP2MP Ethernet connection terminates at one of the points of the Ethernet connection. That is, multiple MEs may terminate at a single service point. In some examples, PE router 6A and PE router 6B may maintain respective maintenance entity group endpoints (MEPs) that each mark the endpoint of a pseudowire in which the corresponding PE routers 6A and 6B participate. MEPs for a pseudowire may connect PE routers 6A and 6B for a particular instance of an L2VPN, such as a VPLS instance. PW label policers of PE routers 6A and 6B may perform pseudowire label monitoring techniques to track pseudowire packets on a pseudowire-specific basis by incrementing counters for the respective pseudowires.

As describe above, MEPs for each of PE routers 6A and 6B may exchange pseudowire label counter values to measure pseudowire packet loss using the messaging protocol described in ITU-T Y.1731. MEPs may perform single-ended and/or dual-ended pseudowire loss measurement. Moreover, while MEPs may perform proactive and/or periodic loss measurement, the techniques are described with respect to periodic loss measurement for single-ended, on-demand OAM in which MEPs of PE routers 6A, 6B exchange loss measurement messages (LMMs) and loss measurement replies (LMRs) having embedded pseudowire label counter values.

To perform loss measurement, an MEP of PE router 6A initiates an on-demand loss measurement by issuing a LMM to an MEP of PE router 6B. That is, the MEP of PE router 6A sends the LMM, including the total counter value as described above, to the MEP of PE router 6B over the pseudowire for which the MEPs operate as endpoints. Responsive to receiving LMM, the MEP of PE router 6B sends a LMR to PE router 6A that includes the total counter value of the LLM and a total counter value stored by PE router 6B for the pseudowire for the which the MEPs operate as endpoints. From the LMR, PE router 6A may determine a difference between the total counter value of the LLM generated by PE router 6A in the LMR and the total counter value generated by PE router 6B in the LMR. The difference may indicate the number of PDUs that were lost when forwarding the PDUs from PE router 6A to PE router 6B using the pseudowire for which the MEPs operate as endpoints.

Figure 2:
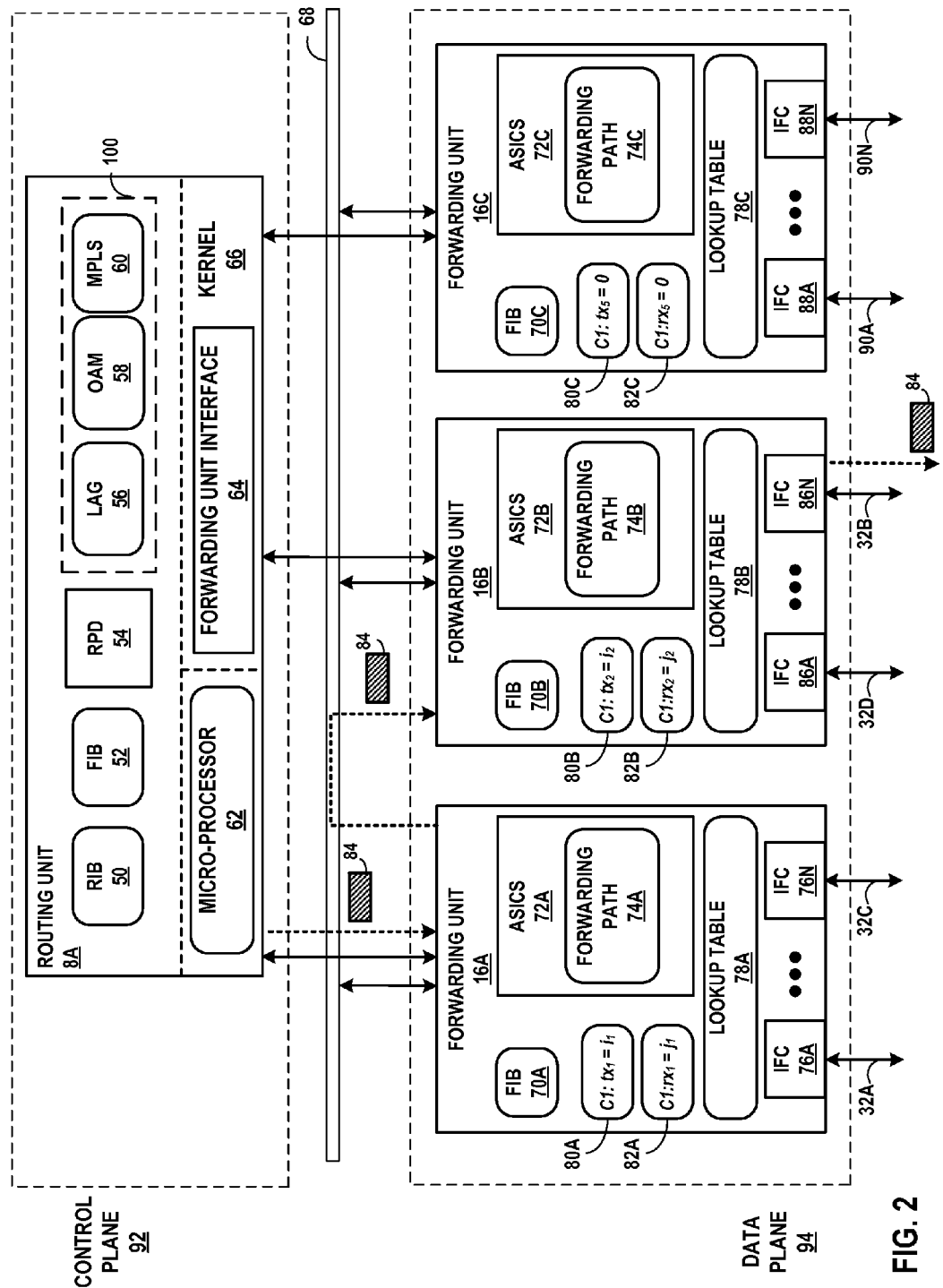
FIG. 2 is a block diagram illustrating, in further detail, an example of the PE router of FIG. 1 that implements techniques for packet loss measurement in a distributed data plane, in accordance with techniques of the disclosure.

FIG. 2 is a block diagram illustrating, in further detail, an example of PE router 6A of FIG. 1 that implements techniques for packet loss measurement in a distributed data plane, in accordance with techniques of the disclosure. In this example, PE router 6A is divided into two logical or physical "planes" to include a first control plane 92 and a second "data" or "forwarding" plane 94. That is, PE router 6A implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software to implement the functionality.

Control plane 92 is illustrated as a centralized control plane wherein control plane functionality is included in routing unit 8A. In some examples, control plane 92 may be a decentralized control plane in that control plane functionality is distributed among one or more routing units and/or service units. Data plane 94 in this example is a decentralized data plane in that data plane functionality and packet forwarding functionality is distributed among a plurality of forwarding units 16A-16C (forwarding units 16). For purposes of illustration only, data plane 94 is shown as having three forwarding units; however, data plane 94 may include fewer or more forwarding units. For example, forwarding unit 16N of PE router 6A is omitted for example purposes in FIG. 2. The example of FIG. 1 describes forwarding units 16A and 16B as the only forwarding units associated with VP 34 for example purposes. However, in the example of FIG. 2, VP 34 is also associated with forwarding unit 16C as described herein for example purposes. In some examples, packet forwarding functionality may be consolidated in a single forwarding unit.

Each of routing unit 8A and forwarding units 16A-16C may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, each of routing unit 8A and forwarding units 16 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Switch fabric 14A couples routing unit 8A and forwarding units 16A-16C to deliver data units and control messages among the units. Switch fabric 14A may represent an internal switch fabric or cross-bar, bus, or link. Examples of high-speed multi-stage switch fabrics used as a data plane to relay packets between units within a router are described in U.S. Patent Application 2008/0044181, entitled MULTI-CHASSIS ROUTER WITH MULTIPLEXED OPTICAL INTERCONNECTS. The entire contents of U.S. Patent Application 2008/0044181 are incorporated herein by reference.

Routing unit 8A of control plane 92 executes the routing functionality of mobile PE router 6A. In this respect, routing unit 8A represents hardware or a combination of hardware and software of control that implements with routing protocol daemon 54 ("RPD 54") routing protocols by which routing information, stored in a routing information base 50 ("RIB 50"), may be exchanged with other routers. RIB 50 may include information defining a topology of a network. RPD 54 may resolve the topology defined by routing information in RIB 50 to select or determine one or more routes through the network. RPD 54 may then generate forwarding information base (FIB) 52 and update data plane 94 with routes from FIB 52, where forwarding units 16A-16C of data plane 94 store these routes in respective FIBs 70A-70C ("FIBs 70"). Further details of one example embodiment of a router can be found in U.S. patent application Ser. No. 12/182,619, filed July 30, entitled "STREAMLINED PACKET FORWARDING USING DYNAMIC FILTERS FOR ROUTING AND SECURITY IN A SHARED DATA PLANE," which is incorporated herein by reference.

Routing unit 8A includes microprocessor 62 that executes program instructions loaded into a main memory (not shown in FIG. 2) from storage (also not shown in FIG. 2) in order to execute a software stack, including both kernel 66 and daemons 100. Microprocessor 52 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Routing unit 8A includes daemons 100 that operate over and interact with kernel 66, which provides a run-time operating environment for user-level processes. Kernel 66 may comprise, for example, a UNIX operating system derivative such as Linux or Berkeley Software Distribution (BSD). Kernel 66 offers libraries and drivers by which daemons 100 may interact with the underlying system. Forwarding unit interface 64 of kernel 66 comprises a kernel-level library by which daemons 100 and other processes may interact with forwarding units 16A-16C.

Routing unit 8A also includes link aggregation module (LAG) 56. Link aggregation module 56 may use one or more link aggregation protocols, such as Link Aggregation Control Protocol (LACP), to aggregate one or more links that operate as a single, logical link. For example, LAG module 56 may generate LACP packets that are exchanged with PE router 6B to configure a Link Aggregation Groups (LAG) that includes links 32B and 32C, such that links 32A and 32C operate as a single logical link. In some examples LAG module 56 may implement other link aggregation and/or load-balancing protocols such as ECMP.

As shown in FIG. 2, routing unit 8A includes MPLS module 60. MPLS module 60 may implement MPLS protocols, such as the Label Distribution protocol (LDP) or the Resource Reservation Protocol with Traffic Engineering extensions (RSVP-TE). PE routers 6A may forward traffic along a particular path, e.g., VP 34, through a network to a destination device such as PE router 6B using labels prepended to the traffic. MPLS module 60 may defines a distinct path, such as VP 34, through the network to carry MPLS packets from the source device to a destination. Using MPLS module 60, PE router 6A allocates one or more labels in association with the destination. MPLS module 6, generally may perform MPLS operations to forward the MPLS packets along established paths.

Routing unit 8A may also include OAM module 58. OAM module 58 implements one or more techniques of the disclosure to perform packet loss measurement. In particular, as described here, OAM module 58 may inject a LMP into data plane 94, which is internally forwarded among forwarding units associated with VP 34. Each of the respective forwarding units may update the LMP by adding transmit and/or receipt counter values to the total transmit and/or receipt counters stored in the LMP. PE router 6A may forward the LMP to a remote router, such as PE router 6B that stamps total transmit counter and/or total receipt counter values from PE router 6B for VP 34. Responsive to PE router 6B sending the LMP back to PE router 6A, OAM module 58 may determine, for example, a difference between the total transmit counter value stamped by PE router 6A for the virtual path and the total receipt counter value stamped by PE router 6B for the virtual path. The difference may indicate the total packet loss on the virtual path between PE router 6A and 6B.

Referring now to data plane 90B, data plane 90B represents hardware or a combination of hardware and software that forward network traffic in accordance with forwarding information. In the example PE router 6A of FIG. 2, data plane 90B includes forwarding units 16A-16C that provide high-speed forwarding of network traffic received by interface cards 76A-76N ("IFCs 76"), 86A-86N ("IFCs 86"), and 88A-88N (IFCs 88). Network traffic may be received by interface cards 76A-76N ("IFCs 76"), 86A-86N ("IFCs 86"), and 88A-88N (IFCs 88) via links 32A, 32C, 32B, 90A, and 90N, respectively. Although, links 32A, 32C, 32D, 32B, 90A, and 90N are illustrated in FIG. 2 for purposes of example only, fewer or more links may be coupled to IFCs of the respective forwarding units 16.

Forwarding units 16A-16C receive and forward control and data packets via switch fabric 68 along internal forwarding paths. Forwarding units 16A-16C may each comprise one or more packet forwarding engines ("PFEs") coupled to respective interface cards and may each represent, for example, a dense port concentrator (DPC), modular port concentrator (MPC), flexible physical interface card (PIC) concentrator (FPC), or another line card, for example, that is insertable within a PE router 6A chassis or combination of chassis. Each of forwarding units 16A-16C may include substantially similar components to perform substantially similar functionality.

As shown in FIG. 2, forwarding units 16A-16C each includes one or more ASIC-based packet processors that process PDUs to identify PDU properties and perform actions bound to the properties. ASICs 72 include one or more programmable application-specific integrated circuits that execute microcode (or "microinstructions") to control and apply fixed hardware components of ASICs 72 to process PDU "keys." A PDU key includes PDU fields and other parameters that determine a flow of PDU processing for the PDU along an internal forwarding path. Each of ASICs 72 may include one or more key buffers to store PDU field data for corresponding PDUs that the key engine is currently processing. Key buffers may also provide limited writable memory to which elements of the internal forwarding path may write to pass messages accessible by future elements.

Each of ASICS 72A-72C may include an internal forwarding paths 74A-74C ("forwarding paths 74) that comprises programmable, executable microcode and fixed hardware components that determine the packet processing actions and other operations. Forwarding paths 74 may include, for example, executable instructions, programmable logic, and application-specific logic that perform lookups, rate limit packet flows, and manipulate PDU keys, among other functions. Internal forwarding paths of PE router 6A may include combinations of respective forwarding paths 74. In other words, one or more of forwarding paths 74 may include only a part of the overall internal forwarding path of PE router 6A.

In accordance with techniques of the disclosure, at initial configuration and/or startup, LAG module 56 may configure network link 32C of forwarding unit 16A, network link 32B of forwarding unit 16B, and network link 90A of forwarding unit 16C to operate as a single logical link when sending and receiving PDUs with PE router 6B. In some example, LAG module 56 may cause PE router 6A to exchange one or more control messages with PE router 6B to use the respective links in a LAG as a single logical link. Based on the configuration by LAG module 56, PE router 6A may use each of the respective links to forward PDUs to PE router 6B MPLS module 60 may configure forwarding units 16A-16C to each forward network traffic to PE router 6B using a common virtual path, e.g., VP 34. That is, MPLS module 60 may configure each of forwarding units 16A-16C to append on or more labels corresponding to VP 34 to PDUs forwarded to PE router 6B. In some example, MPLS module 60 may cause PE router 6A to exchange one or more control messages with PE router 6B to use VP 34. MPLS module 60 may configure forwarding units 16A-16C to forward PDUs on VP 34 using a single logical link comprised of network link 32C of forwarding unit 16A, network link 32B of forwarding unit 16B, and network link 90A of forwarding unit 16C. That is, MPLS module 60 may store information that associates VP 34 with the LAG comprised of network link 32C of forwarding unit 16A, network link 32B of forwarding unit 16B, and network link 90A of forwarding unit 16C, that operate as a single logical link.

OAM module 58, in accordance with techniques of the disclosure, may configure a transmit and receipt counter at each of forwarding units 16A-16C, where each transmit and receipt counter respectively corresponds to VP 34 generated by MPLS module 60. Although described as configuring both a transmit and receipt counter, in some examples, OAM module 58 may configure only a transmit counter or only a receipt counter at one or more of forwarding units 16A-16C. OAM module 58 may initially define a counter identifier that corresponds to the virtual path configured by MPLS module 60. In the example of FIG. 2, the counter identifier associated with the virtual path may be C1. OAM module 58 may store information that represents an association between an identifier of VP 34 configured by MPLS module 60 and the counter identifier.

As shown in FIG. 2, OAM module 58 may configure forwarding unit 16A to maintain a transmit counter 80A, which is identified as $tx_1$ and having a value of $i_1$. OAM module 58 may configure forwarding unit 16A to associate the counter identifier C1 with transmit counter 80A. OAM module 58 may configure forwarding unit 16A to maintain a receipt counter 82A, which is identified as $rx_1$ and having a value of $j_1$. OAM module 58 may configure forwarding unit 16A to associate the counter identifier C1 with receipt counter 82A. ASICS 72A may increment transmit counter 80A each time a forwarding unit 16A forwards a PDU using VP 34. Similarly, ASICS 72A may increment receipt counter 82A each time a forwarding unit 16A receives a PDU using VP 34. Forwarding unit 16A may also include lookup table 78A. Lookup table 78A may include an association between an identifier of VP 34 generated by MPLS module 60 and the counter identifier C1. In this way, when ASICS 72A process a PDU (e.g., by forwarding or receiving the PDU), ASICS 72A may perform a lookup of the counter identifier based on the identifier of VP 34 on which the PDU will be forwarded or was received. Based on identifying the respective transmit or receipt counter using the counter identifier for VP 34, ASICS 72A may increment the respective counter.

As shown in FIG. 2, OAM module 58 may configure forwarding unit 16B to maintain a transmit counter 80B, which is identified as $tx_2$ and having a value of $i_2$. OAM module 58 may configure forwarding unit 16B to associate the counter identifier C1 with transmit counter 80B. OAM module 58 may configure forwarding unit 16A to maintain a receipt counter 82B, which is identified as $rx_2$ and having a value of $j_2$. OAM module 58 may configure forwarding unit 16B to associate the counter identifier C1 with receipt counter 82B. ASICS 72B may increment transmit counter 80B each time forwarding unit 16B forwards a PDU using VP 34. Similarly, ASICS 72B increment receipt counter 82B each time a forwarding unit 16B receives a PDU using VP 34. Forwarding unit 16B may also include lookup table 78B. Lookup table 78B may include an association between an identifier of VP 34 generated by MPLS module 60 and the counter identifier C1. In this way, when ASICS 72B process a PDU (e.g., by forwarding or receiving the PDU), ASICS 72B may perform a lookup of the counter identifier based on the identifier of VP 34 on which the PDU will be forwarded or was received. Based on identifying the respective transmit or receipt counter using the counter identifier for the virtual path, ASICS 72B may increment the respective counter.

As shown in FIG. 2, OAM module 58 may configure forwarding unit 16C to maintain a transmit counter 80C, which is identified as $tx_3$ and having a value of $i_3$. OAM module 58 may configure forwarding unit 16C to associate the counter identifier C1 with transmit counter 80C. OAM module 58 may configure forwarding unit 16C to maintain a receipt counter 82C, which is identified as $rx_3$ and having a value of $j_3$. OAM module 58 may configure forwarding unit 16C to associate the counter identifier C1 with receipt counter 82C. ASICS 72C may increment transmit counter 80C each time forwarding unit 16C forwards a PDU using VP 34. Similarly, ASICS 72C may increment receipt counter 82C each time a forwarding unit 16C receives a PDU using VP 34. Forwarding unit 16C may also include lookup table 78C. Lookup table 78C may include an association between an identifier of the virtual path generated by MPLS module 60 and the counter identifier C1. In this way, when ASICS 72C process a PDU (e.g., by forwarding or receiving the PDU), ASICS 72C may perform a lookup of the counter identifier based on the identifier of VP 34 on which the PDU will be forwarded or was received. Based on identifying the respective transmit or receipt counter using the counter identifier for the virtual path, ASICS 72C may increment the respective counter.

Forwarding units 16 switch PDUs with PE router 6B using the virtual path generated by MPLS module 60. For instance, forwarding units 16 may receive PDUs, perform lookups to determine respective destinations of the PDUs, and forward the PDUs to the respective destinations. In some examples, forwarding units 16 may receive PDUs from PE router 6B and/or forward PDUs to PE router 6B. Forwarding units 16 may each use the respective links configured in a LAG as described above in FIG. 2 to forward PDUs on the single logical link defined by the LAG.

As forwarding units 16A-16C receive and forward PDUs for the virtual path defined by MPLS module 60, ASICS 72A-72C may increment counters $tx_1$, $rx_1$, $tx_2$, $rx_2$, $tx_3$, $rx_3$, accordingly. That is, ASICS 72A-72C may increment respective transmit counters, responsive to the respective forwarding unit processing a PDU for VP 34 using one of the plurality of links. In some examples, processing the PDU may include forwarding the PDU and/or receiving the PDU, in which the forwarding unit increments the respective counter based on whether the PDU is forwarded and/or received.

Although techniques of the disclosure are described with respect to functionality provided by routing unit 8A, some portion or all of the functionality, performed may be performed by one or more of forwarding units 16A-16C. For instance, setting the bits in the mask of the internal deader as described herein may be performed by one of forwarding units 16A-16C. In some examples, a single forwarding unit associated with multiple virtual paths, may configure a mask (as described in FIG. 2 being performed by routing unit 8A) for a respective virtual path of the multiple virtual paths when configuring the mask. In this way, various functionality performed by routing unit 8A may be distributed among forwarding units 16A-16C. Each of forwarding units 16A-16C may perform such functionality when performing loss measurement for different sets of virtual paths. In this way, techniques of the disclosure may exhibit improved scalability by distributing such functionality to forwarding units 16A-16C.

In accordance with techniques of the disclosure, OAM module 58 may initiate a packet loss measurement based on input from an administrator or as an automated or scheduled process. OAM module 58 may initially generate LMP 84. OAM 58 may append an internal header to LMP 84.

As described in FIG. 1, the internal header may include an opcode that indicates a specified operation to be performed by forwarding units 16. In particular, the specified operation may cause ASICs 72 to determine a respective counter identifier indicated in the internal header. As further described below, based on the operation, ASICs 72 may add the corresponding counter value maintained by the forwarding unit to a total counter value stored in LMP 84.

The internal header of LMP 84 may also include the counter identifier for the virtual path generated by MPLS module 60. In FIG. 2, the counter identifier is C1 that is associated with VP 34. OAM module 58 stores the counter identifier C1 in the internal header of LMP 84.

OAM module 58 also includes a mask implemented as a bitmap in LMP 84. Each bit of the mask may correspond to a different one of forwarding units 16A-16C that are associated with VP 34. OAM module 58 may maintain information that assigns each bit index to a different forwarding unit. For each bit index that corresponds to a forwarding unit associated with VP 34, the bit may be set to '1'. For each bit index that corresponds to a forwarding unit that is not associated VP 34, the bit may be set to '0'. To set the bits, OAM module 58 may use a lookup table (not shown) that includes associations between identifiers of virtual paths and identifiers of forwarding units 16.

In some examples, OAM module 58 may determine the respective counter values for a particular virtual path, as sample counter values. OAM module 58 may determine the respective counter values on a periodic basis and store the values. For instance, OAM module 58 may determine the respective counter values prior to injecting a LMP in the data plane to perform loss measurement. That is, OAM module 58 may preliminarily and not responsive to a packet loss measurement, determine the respective counter values corresponding to a particular virtual path, such as the virtual path generated by MPLS module 60 in FIG. 2. In some examples, based on the sample counter values, OAM module 58 may determine whether one or more of the sample counter values satisfy a threshold value. In some examples, the threshold value may be zero. In other examples, the threshold value may be a non-zero value. If a sample counter value is zero, for example, OAM module 58 may set the bit to zero in the mask for the index of the forwarding unit that includes the counter on which the sample counter value was based. That is, although the forwarding unit is associated with VP 34 for which OAM module 58 has generated the LMP, OAM module 58 may set the bit to zero in the mask at the index corresponding to the forwarding unit. For instance, as shown in FIG. 2, although forwarding unit 16C may be configured to forward and receive PDUs for VP 34, OAM module 58 may determine that one or more of counters 80C and 82C are zero. Based on one or more of counters 80C and 82C being equal to zero, OAM module 58 may set the bit in the mask at the index corresponding to forwarding unit 16C to zero. In this way, each bit that corresponds to a respective forwarding unit that, is associated with VP 34 and includes a non-zero counter value for a counter associated with VP 34, may be set to 1. Similarly, each bit that corresponds to a respective forwarding unit that, is not associated with VP 34 or includes a zero counter value for a counter associated with VP 34, is set to 0.

Based on an identifier of VP 34 generated by MPLS module 60, OAM module 58 may set bits in the mask corresponding to forwarding units 16A and 16B to '1', while forwarding unit 16C is set to '0' based on the zero value of one or more of counters 80C and 82C. As described in this disclosure, each respective forwarding unit associated with VP 34 may use the mask to internally forward LMP 84 to the next forwarding unit associated with VP 34.

OAM module 58 may include a next hop identifier in the internal header of LMP 84 for the PE router to which PE router 6A will forward LMP 84 after internally traversing forwarding units 16A and 16B. In the example of FIG. 1, the next hop identifier may identify PE router 6B. OAM module 84 may using information included in FIB 52 to determine the next hop identifier for PE router 6B. The next hop identifier in FIG. 2 may be an L2 address that identifies PE router 6B.

Upon generating LMP 84 with the appended internal header, OAM module 58 may inject LMP 84 into forwarding unit 16A because forwarding unit 16A forwards and receives PDUs using the VP 34. Responsive to receiving LMP 84, ASICs 72A determine the opcode included in the internal header. Based on the opcode, ASICs 72A may fetch one or more instructions to update one or more total counter values included in LMP 84.

ASICs 72A may update LMP 84, based at least in part on one or more of counters 80A and 82A identified by counter identifier C1. In some examples, to update LMP 84, ASICs 72A, based on the opcode, determines the counter identifier C1 included in the internal header. ASICs 72A perform a lookup in lookup table 78A for counters associated with counter identifier C1. Based on the lookup, ASICs 72A determines that transmit counter 80A and receipt counter 82A are associated with counter identifier C1. ASICs 72A add the value $i_1$ of transmit counter 80A to the total transmit counter value in LMP 84. ASICs 72A may add the value $j_1$ of receipt counter 82A to the total receipt counter value in LMP 84. In some examples, OAM module 58 initializes the respective total counter values of LMP 84 to zero before sending to any of forwarding units 16 indicated by the mask of LMP 84.

Upon updating LMP 84 based on counters 80A and 82A associated with counter identifier C1, ASICs 72A may determine the bit index in the mask of the internal header for LMP 84 for forwarding unit 16A. Forwarding unit 16A may maintain a lookup table (not shown and that is different from lookup table 78A) between bit indexes and forwarding units based on information received from OAM module 58. ASICs 72A may set the value from '1' to '0' for the determined bit index that corresponds to forwarding unit 16A. Based on the lookup table and the mask of the internal header, ASICs 72A may determine a next forwarding unit (e.g., forwarding unit 16B). For instance, ASICs 72A may determine that the bit value at the bit index of the mask that corresponds to forwarding unit 16B is set to 1. Therefore, ASICs 72A may internally forward LMP 84 to forwarding unit 16B using switch fabric 68.

Responsive to receiving LMP 84, ASICs 72B determine the opcode included in the internal header. Based on the opcode, ASICs 72B may fetch one or more instructions to update one or more total counter values included in LMP 84. ASICs 72B may update LMP 84, based at least in part on one or more of counters 80B and 82B identified by counter identifier C1. In some examples, to update LMP 84, ASICs 72B, based on the opcode, determines the counter identifier C1 included in the internal header. ASICs 72B perform a lookup in lookup table 78B for counters associated with counter identifier C1. Based on the lookup, ASICs 72B determines that transmit counter 80B and receipt counter 82B are associated with counter identifier C1. ASICs 72B add the value $i_2$ of transmit counter 82A to the total transmit counter value in LMP 84. ASICs 72B may add the value $j_2$ of receipt counter 82B to the total receipt counter value in LMP 84.

Upon updating LMP 84 based on counters 80B and 82B associated with counter identifier C1, ASICs 72B may determine whether values at any of the indexes of the mask in the internal header of loss measurement 84 are set to 1. In the example of FIG. 2, none of the values at any of the indexes of the mask are set to zero, and therefore there are no more remaining forwarding units to forward LMP 84. That is, in the example of FIG. 2, forwarding units 16A and 16B may be the only two forwarding units that forward and receive PDUs using VP 34. Consequently, ASICs 72B may determine, based on the mask, that LMP 84 has internally traversed each forwarding unit indicated by the mask of LMP 84. Responsive to determining that LMP 84 has traversed each forwarding unit, ASICs 72B may remove the internal header from LMP 84. That is, responsive to determining, based on the mask, that the LMP has been updated by all of the remaining forwarding units associated with VP 34, ASICs 72B may remove the internal header of the LMP. ASICs 72B may determine the next hop identifier included in the internal header, which in the example of FIG. 2, may be an L2 address of PE router 6B. ASICs 72B may append the L2 address in a new and or modified external header of LMP 84. ASICs 72B may forward LMP 84, using the L2 address specified in the internal header, to PE router 6B.

PE router 6B may stamp LMP 84 with counter values associated with VP 34. For instance, PE router 6B may update LMP 84 based on transmit and receipt counters that are associated with VP 34. PE router 6B may store, in LMP 84, the total number of PDUs received by PE router 6B for VP 34 and/or the total number of PDUs forwarded by PE router 6B for VP 34. PE router 6B may forward LMP 84 back to PE router 6A.

In the example of FIG. 1, OAM module 58 may receive LMP 84 from data plane 94, which initially receives LMP 84 from PE router 6B. To perform a packet loss measurement for VP 34, OAM module 58 may determine a difference between the total number of PDUs forwarded by PE router 6A to PE router 6B using VP 34 and the total number of PDUs received by PE router 6B from PE router 6A using VP 34. From LMP 84, OAM module 58 may select the total transmit counter value stamped by PE router 6A that comprises the sum of $tx_1$ and $tx_2$, and may also select the total receipt counter value stamped by PE router 6B. The difference between the total transmit counter stamped by PE router 6A for VP 34 and the total receipt counter value stamped by PE router 6B for VP 34 indicates the number of PDUs that were lost when forwarding the PDUs from PE router 6A to PE router 6B using VP 34.

In some examples, when performing loss measurement, one or more transmit counters and receipt counters may not be synchronized. For instance, PE routers 6A and 6B may send and receive multiple LMPs, wherein each LMP includes at least one counter value determined by at least one of the PE routers 6A and 6B at a particular point in time. PE router 6A may exchange LMPs with PE router 6B to perform loss measurement as described in RFC 6374 entitled "MPLS Loss and Delay Measurement," September 2011, which is incorporated by reference herein in its entirety. For instance, PE router 6A may initially send a loss measurement packet, $LMP_1$, that includes A_T×P[n], which indicates the total count of packets transmitted by PE router 6A over the virtual path prior to the time this $LMP_1$ is transmitted to PE router 6B. PE router 6B may store a value B_R×P[n] in $LMP_1$, the total count of packets received PE router 6B over the virtual path at the time this message is received (excluding $LMP_1$ itself). PE router may store a value B_T×P[n] in $LMP_1$, which indicates the total count of packets transmitted by PE router 6B over the virtual prior to the time that $LMP_1$ is transmitted by PE router 6B to PE router 6A. PE router 6B may forward $LMP_1$ back to PE router 6A.

When $LMP_1$ is received back at PE router 6A, PE router 6A may determine and/or store in $LMP_1$, the value A_R×P[n], which may indicate the total count of packets received by PE router 6A over the virtual path at the time $LMP_1$ is received at PE router 6A (excluding $LMP_1$ itself). PE router 6A may have also previously exchanged a second loss-measurement packet with PE router 6B, $LMP_0$, in which A_T×P[n−1], B_R×P[n−1], B_T×P[n−1], A_R×P[n−1], are similarly determined and/or stored in $LMP_0$ as described above with respect to $LMP_1$. PE router 6A may perform a loss measurement using the following calculation for transmit loss measurement:

$$A\_T\times Loss[n-1,n]=(A\_T\times P[n]-A\_T\times P[n-1])-(B\_R\times P[n]-B\_R\times P[n-1])$$

PE router 6A may perform loss measurement using the following calculation for receipt loss measurement:

$$A\_R\times Loss[n-1,n]=(B\_T\times P[n]-B\_T\times P[n-1])-(A\_R\times P[n]-A\_R\times P[n-1])$$

In some examples, PE router 6A may not write the fourth count, A_R×P[n], in the message.

Figure 3:
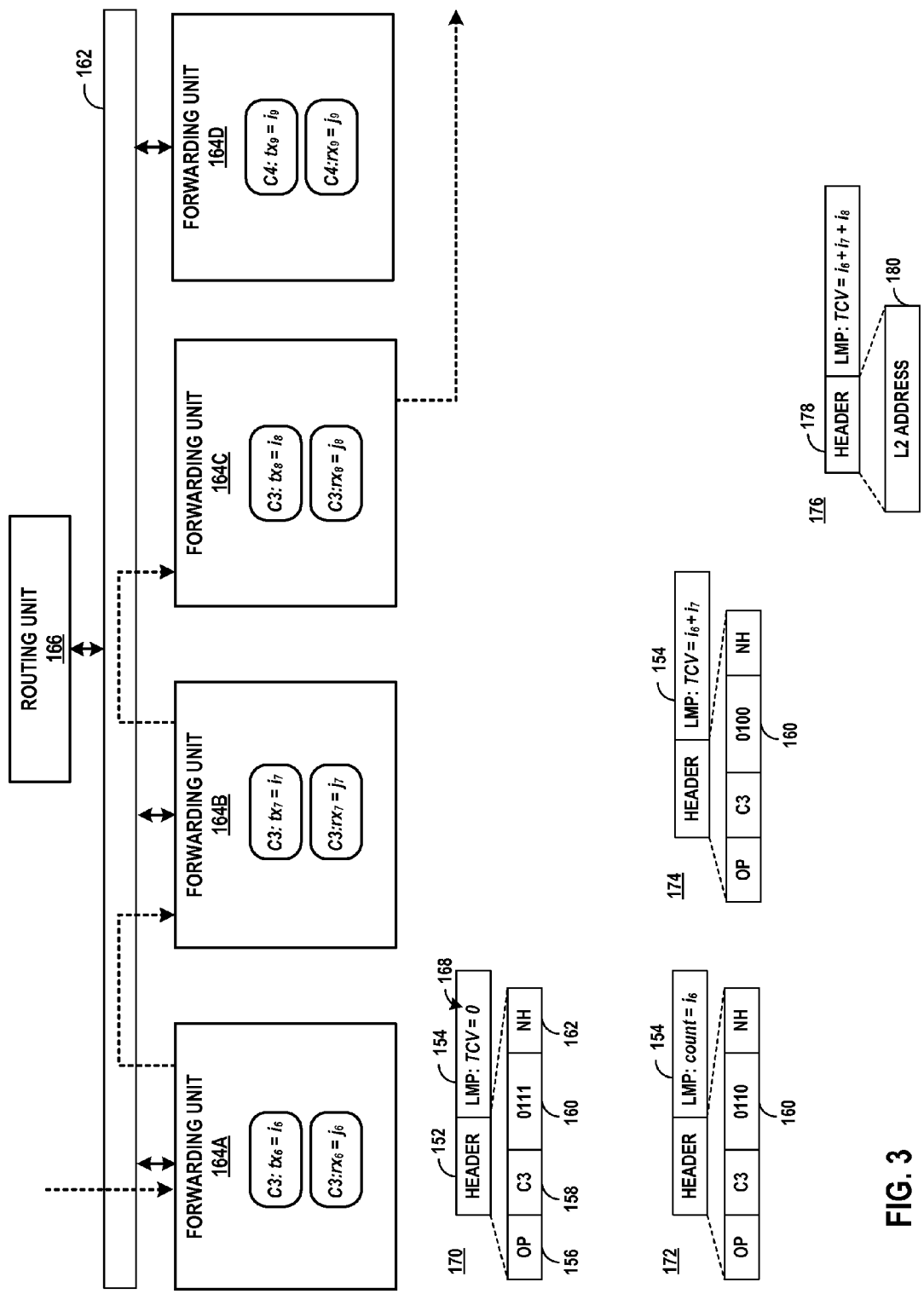
FIG. 3 is a block diagram illustrating changes to the internal header of a LMP in a distributed data plane as the LMP is internally forwarded, in accordance with techniques of the disclosure.

FIG. 3 is a block diagram illustrating changes to the internal header of a LMP in a distributed data plane as the LMP is internally forwarded, in accordance with techniques of the disclosure. FIG. 3 illustrates forwarding units 164A-164D ("forwarding units 164") that are each coupled to switch fabric 162. Forwarding units 164 and switch fabric 162 may be included in a PE router together with a routing unit 166 that is also coupled to switch fabric 162.

Initially, routing unit 66 may configure forwarding units 164A-164C to forward and receive PDUs using a common virtual path as described in FIGS. 1-2. Routing unit 166 may define a counter identifier C3 that is associated with the common virtual path. Routing unit 166 may configure forwarding units 164A-164C to each maintain counters for the common virtual path. For instance, forwarding unit 164A includes transmit counter $tx_6$ and receipt counter $rx_6$, which are each associated with the counter identifier C3. When forwarding unit 164A forwards a PDU using the common virtual path, forwarding unit 164A may increment $tx_6$. Similarly, when forwarding unit 164A receives a PDU using the common virtual path, forwarding unit 164A may increment $rx_6$. Routing unit 166 may configure forwarding units 164B-164C in a similar manner with transmit counters $tx_7$, $rx_7$, $tx_8$, $rx_8$, to increment the respective counters upon forwarding and receiving PDUs. Forwarding unit 164D may be configured to count forwarding and transmitting of PDUs for a virtual path (e.g., identified by counter identifier C4) that is different than the virtual path associated with counter identifier C3.

In accordance with techniques of the disclosure, routing unit 166 may initiate a packet loss measurement based on input from an administrator or as an automated or scheduled process. Routing unit 166 may initially generate a LMP 154. FIG. 3 illustrates the contents of LMP 154 and internal header 152 at different points in time. For instance, FIG. 3 illustrates the contents of LMP 154 and internal header 152 at time 170, when LMP 154 and internal header 152 are initially created by routing unit 166. Routing unit 166 appends an internal header 152 to LMP 154. The internal header includes an opcode 156 that indicates a specified operation to be performed by a forwarding unit. In particular, the specified operation may determine a counter identifier 158 indicated in internal header 152. The operation may add the corresponding counter value maintained by the forwarding unit to a total counter value 168 stored in LMP 154. Total counter value 168 stored in LMP 154A may correspond to the total number of PDUs forwarded on a particular VP by a particular PE router, or the total number of PDUs received by the particular PE router using a particular VP. LMP 154 may include multiple total counter values, for instance, a total number of PDUs sent on a particular VP and a total number of PDUs received using the particular VP.

Internal header 152 of LMP 154 may also include counter identifier 158 for the common virtual path used by forwarding units 164A-164C. In the example of FIG. 1, the counter identifier may be C3 that is associated with the common virtual path. Therefore, the counter identifier C3 may be included in internal header 152 of LMP 154.

Internal header 152 of LMP 154 may also include a mask 160. Each bit of mask 160 may correspond to a different one of forwarding units 164A-164D. In some examples, routing engine 166 may maintain information that assigns each bit index to a different forwarding unit. For each bit index that corresponds to a forwarding unit associated with the common virtual path used by forwarding units 164, the bit may be set to '1'. For each bit index that corresponds to a forwarding unit that is not associated with the common virtual path, the bit may be set to '0'. To set the bits, routing engine 166 may use a lookup table that includes associations between identifiers of VPs and identifiers of forwarding units. Based on an identifier of the common virtual path used by forwarding units 164A-164C, routing engine 166 may set bits in mask 160 corresponding to forwarding units 164A-164C to '1', while the remaining bit corresponding to forwarding unit 164D may be '0'. As described in this disclosure, each respective forwarding unit associated with the common virtual path may use mask 160 to internally forward LMP 154 to the next forwarding unit associated with the common virtual path.

In the example of FIG. 3, for mask 160, bit index 0 may correspond to forwarding unit 164A, bit index 1 may correspond to forwarding unit 164B, bit index 2 may correspond to forwarding unit 164C, and bit index 3 may correspond to forwarding unit 164D. The rightmost bit in the example of FIG. 3 is bit index 0 and the leftmost bit is bit index 3. Because each of forwarding units 164A-164C use the common virtual path, control unit 166 sets each of the bits in mask 160 at indexes 0-2 to a value of 1. Because forwarding unit 164D does not use the common-virtual path, control unit 166 sets the bit in mask 160 at index 3 to a value of 0.

Routing unit 166 also includes in internal header 152, a next hop identifier 162 for a network device to which the PE router that includes forwarding units 164 will forward LMP 154 after internally traversing forwarding units 164A-164C. In the example of FIG. 1, next hop identifier 162 may identify a second or next PE router. Examples of next hop identifier 168 may include an IP address, MAC address, or any other suitable identifier.

Upon generating LMP 154 with appended internal header 152, routing engine 166 may inject LMP 154 into forwarding unit 164A because forwarding unit 164A sends and receives PDUs using the common virtual path also used by forwarding units 164B-164C. Although described in some examples as a routing engine or control plane that injects the LMP into a forwarding unit, in some examples, a forwarding unit itself may implement one or more techniques of the disclosure, including generating the LMP and internally forwarding the LMP to another forwarding unit. In some examples, a routing engine may initially inject the LMP into a forwarding unit that is not associated with the virtual path, and the forwarding unit not associated with the virtual path may forward the LMP to a forwarding unit that is associated with the virtual path. In some examples, a forwarding unit not associated with the virtual path may initially generate the LMP and forward the LMP to a forwarding unit that is associated with the LMP. In any case, responsive to receiving LMP 154, forwarding unit 164A determines that opcode 156 is included in internal header 152. Based on opcode 156, forwarding unit 164A may fetch one or more instructions to update total counter value 168 included in LMP 154.

Forwarding unit 164A may update total counter value 168, based at least in part on one or more counter values identified by counter identifier C3. In some examples, to update total counter value 168, forwarding unit 164A, based on opcode 156, determines the counter identifier 158 (e.g. C3) included in internal header 152. Forwarding unit 164A performs a lookup in a lookup table for counters associated with counter identifier 158. Based on the lookup, forwarding unit 164A determines that counter $tx_6$ is associated with counter identifier C3. Forwarding unit 164A may add the value $i_6$ of counter $tx_6$ to total transmit counter value 168 in LMP 154. In some examples, routing unit 166 initializes total counter value 168 to zero by routing engine 166 before sending to any of the forwarding units associated with the common virtual path used by forwarding units 164A-164C. FIG. 3 illustrates the content of header 152 and LMP 154 at time 172 that occurs after time 170. That is, FIG. 3 at time 172 illustrates how values of mask 160 and total counter value 168 change after LMP 154 and header 152 are processed by forwarding unit 164A.

Upon updating total counter value 168 based on counter $tx_6$ associated with counter identifier C3, forwarding unit 164A may determine the bit index for forwarding unit 164A in mask 160A. In some examples, forwarding unit 164A may maintain a lookup table between bit indexes and forwarding units based on information received from routing unit 166. Forwarding unit 164A may set the value from '1' to '0' for bit index 0 that corresponds to forwarding unit 164A. Based on the lookup table and mask 160 of internal header 152, forwarding unit 164A may determine a next forwarding unit (e.g., forwarding unit 164B). For instance, forwarding unit 164A may determine that the bit value at bit index 1 of the mask 160 is set to 1. Therefore, forwarding unit 164A may internally forward LMP 154 with internal header 152 to forwarding unit 164B using switch fabric 162.

Responsive to receiving LMP 154, forwarding unit 164B determines opcode 156 included in internal header 152. Based on the opcode 156, forwarding unit 164B fetches one or more instructions to update total counter value 168 included in LMP 154. Forwarding unit 164B may update LMP 154, based on identified by counter identifier C3. To update LMP 154, forwarding unit 164B, based on opcode 156, determines the counter identifier C3 included in internal header 152. Forwarding unit 164B perform a lookup in a lookup table for counters associated with counter identifier C3. Based on the lookup, forwarding unit 164B determines that transmit counter $tx_6$ is associated with counter identifier C3. Forwarding unit 164B add the value $i_6$ of transmit counter C3 to total counter value 168 in LMP 154.

Upon updating total counter value 168 based on counter $tx_7$ associated with counter identifier C3, forwarding unit 164B determines the bit index for forwarding unit 164B in mask 160. Forwarding unit 164B may set the value from '1' to '0' for bit index 1 that corresponds to forwarding unit 164B. Using mask 160 of internal header 152, forwarding unit 164B may determine a next forwarding unit (e.g., forwarding unit 164C) that uses the common virtual path, which has not yet processed LMP 154. For instance, forwarding unit 164B may determine that the bit value at bit index 2 of the mask 160 is set to 1. Therefore, forwarding unit 164B may internally forward LMP 154 with internal header 152 to forwarding unit 164C using switch fabric 162. FIG. 3 illustrates the content of header 152 and LMP 154 at time 174 after forwarding unit 164B has processed header 152 and LMP 154 and forwarded LMP 154 to forwarding unit 164C. In the example of FIG. 3, time 172 may occur after time 170, and time 174 may occur after time 172.

Forwarding unit 164C also updates LMP in a similar manner as described with respect to forwarding units 164A-164B. Upon updating LMP 154 using value $i_8$ of counter $tx_8$, forwarding unit 164C, as with forwarding units 164A and 164B, may determine whether values at any of the indexes of mask 160 in internal header 152 are set to 1. In the example of FIG. 3, none of the values at any of the remaining indexes of mask 152 are set to zero, and therefore, there are no more remaining forwarding units to forward LMP 154. That is, in the example of FIG. 3, forwarding units 164A-164C may be the only three forwarding units that forward and receive PDUs using the common virtual path.

Forwarding unit 164C may determine, based on mask 160, that LMP 154 has internally traversed each forwarding unit indicated by mask 154. Responsive to determining that LMP 164 has traversed each forwarding unit, forwarding unit 164C may remove internal header 152 from LMP 154. Forwarding unit 164C may determine next hop identifier 162 included in internal header 152, which may be an L2 address of a second network device that receives PDUs using the common virtual path from forwarding units 164A-164C. Forwarding unit 164C may append L2 address 180 in a new and or modified header 178 of LMP 154. Forwarding unit 164C forwards LMP 154, using L2 address 180 specified in internal header 178, to the second network device. FIG. 3, illustrates the contents of header 178 and LMP 154 at time 176, which occurs after time 174, in some examples.

The second network device may stamp LMP 154 with counter values associated with the common virtual path used by forwarding units 164A-164C to forward and receive PDUs and which is associated with counter identifier C3. For instance, the second network device may update LMP 154 based on receipt counters that are associated with the common virtual path. The second network device may store, in LMP 154, the total number of PDUs received by the second network device for the common virtual path. The second network device may forward LMP 154 back to the PE router that includes forwarding units 164.

Routing unit 166 may receive LMP 154 from one of forwarding units 164A-164C, which initially receives LMP 154 from the second network device. To perform a packet loss measurement for the common virtual path that uses forwarding units 164A-164C, routing unit 166 may determine a difference between the total number of PDUs forwarded by the PE router that includes forwarding units 164 to the second network device using the common virtual path and the total number of PDUs received by the second network device from PE router 6 the PE router that includes forwarding units 164 using the common virtual path. From LMP 154, routing unit may select the total transmit counter value stamped the PE router that includes forwarding units 164 that comprises the sum of $i_6+i_7+i_8$, and may also select the total receipt counter value stamped by the second network device. The difference between the total transmit counter and the total receipt counter indicates the number of PDUs that were lost when forwarding the PDUs from PE router that includes forwarding units 164 using the common virtual path to the second network device.

Figure 4:
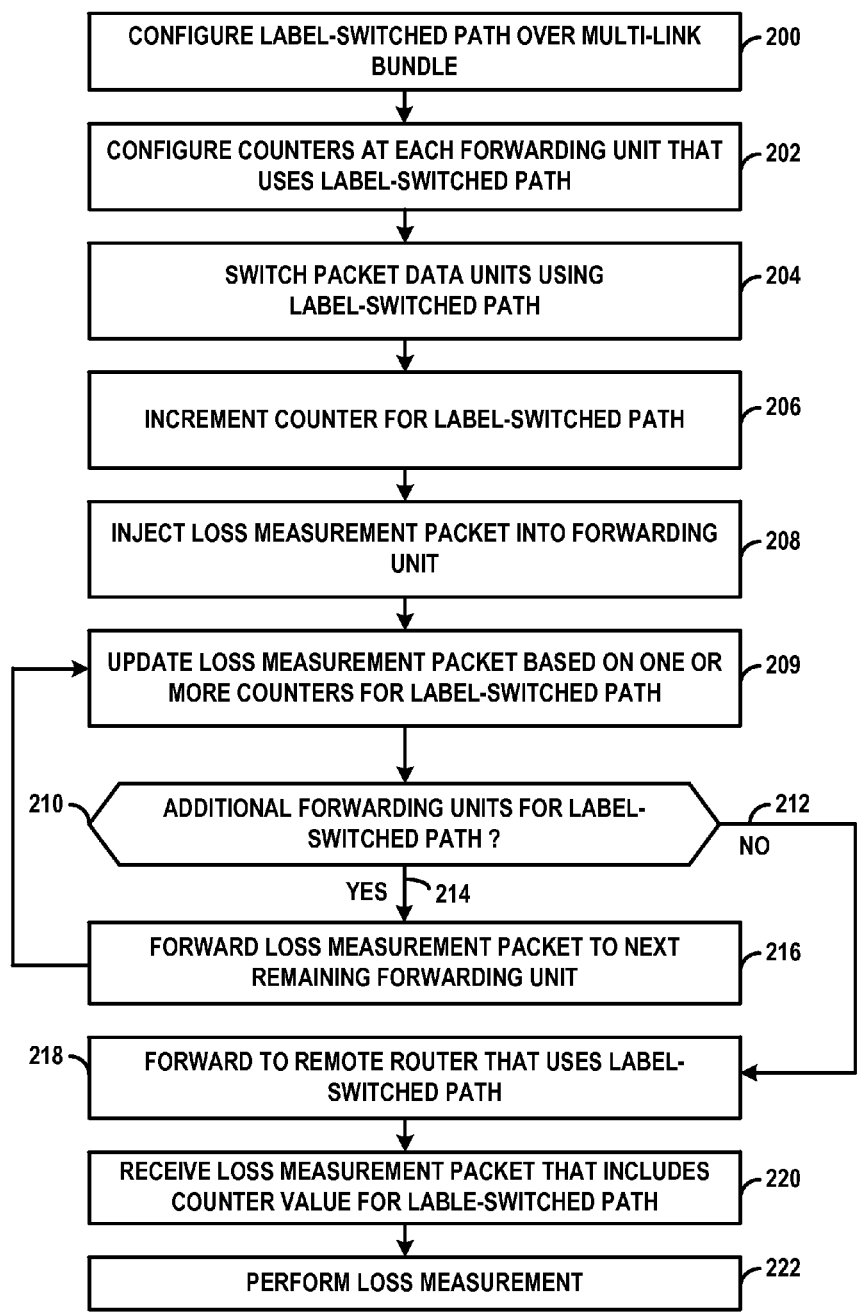
FIG. 4 is a flowchart that illustrates example operations of the PE router of FIG. 1 that implements techniques for packet loss measurement in a distributed data plane, in accordance with techniques of the disclosure.

FIG. 4 is a flowchart that illustrates example operations of a PE router 6A of FIG. 1 that implements techniques for packet loss measurement in a distributed data plane, in accordance with techniques of the disclosure. While described with respect to PE router 6A in FIG. 1, the techniques may be implemented by any type of network device capable of performing one or more functions of PE route r6A described in the disclosure.

Referring to FIG. 1, PE router 6A may initially configure a virtual path over a multi-link bundle using a distributed data plane (200). For instance, PE router 6A may configure multiple forwarding units to forward and receive PDUs using a multi-link bundle. The multi-link bundle may be multiple links that are configured to operate as a single logical link, such as in a LAG multi-link bundle. As described in FIGS. 1-2, PE router 16A may configure a virtual path to use the single logical link. That is, PDUs forwarded and received using the virtual path are transmitted using the single logical link.

PE router 6A may configure transmit and/or receipt counters at each forwarding unit associated with the virtual path (202). For instance, as described in FIGS. 1-2, PE router 6A may identify each forwarding unit associated with the virtual path and configure a transmit and/or receipt counter at each respective forwarding unit associated with the virtual path. As each forwarding unit forwards and/or receives PDUs associated with the virtual path, the respective forwarding unit may increment the transmit and/or receipt counters.

PE router 6A may switch L2 PDUs with another router (e.g., PE router 6B) using the virtual path. For instance, switching PDUs may refer to receiving a PDU, performing a lookup to determine the destination of the PDU, and forwarding the PDU to the destination (204). As PE router 6A receives and forwards PDUs for the virtual path, forwarding units associated with the virtual path may increment counters, accordingly (206). That is, the forwarding units may increment respective transmit counters responsive to the respective forwarding unit processing a PDU for the virtual path using one or more of the plurality of links. In some examples, processing the PDU may include forwarding the PDU and/or receiving the PDU, in which the forwarding unit increments the respective counter based on whether the PDU is forwarded and/or received.

PE router 6A may initiate a packet loss measurement based on input from an administrator or as an automated or scheduled process. Upon generating a LMP with an appended internal header, as described in FIGS. 1-3, PE router 6A may inject the LMP into one of the forwarding units that forwards and receives PDUs using the virtual path (208). Upon receiving the LMP, the forwarding unit may update the LMP with the transmit and/or receipt counter values stored by the forwarding unit (209). For instance, the forwarding unit may add the transmit and receipt counter values to total transmit and receipt counter values stored in the LMP.

Based on the contents of the internal header, the forwarding unit of PE router 6A may determine if there are additional forwarding units associated with the virtual path that have not yet updated the LMP (210). If the forwarding unit determines that additional remaining forwarding units associated with the virtual path exist that have not yet updated the LMP (214), the forwarding unit forwards the LMP to one of the remaining forwarding units (216). If, however, the forwarding unit determines that all of the forwarding units associated with the virtual path have updated the LMP (212), the forwarding unit may forward the LMP to a remote router (e.g., PE router 6B) that uses the virtual path (218). The remote router may update the LMP with transmit and receipt counters associated with the virtual path that are maintained by forwarding units of the remote router. The remote router may send the LMP to PE route 6A (e.g., "local router").

PE router 6A may receive the LMP from the remote router. To perform a packet loss measurement for the virtual path (222), PE router 12A may determine a difference between the total number of PDUs forwarded by PE router 6A to the remote router using the virtual path and the total number of PDUs received by the remote router from PE router 6A using the virtual path. From the LMP, PE router 6A may select the total transmit counter value stamped by PE router 6A that comprises the number of PDUs forwarded by PE router 6A to the remote router, and may also select the total receipt counter value stamped by the remote router that comprises the number of PDUs received by the remote router from PE router 6A. The difference between the total transmit counter stamped by PE router 6A for the virtual path and the total receipt counter stamped by the remote router for the virtual path indicates the number of PDUs that were lost when forwarding the PDUs from PE router 6A to the remote router using the virtual path.

Figure 5:
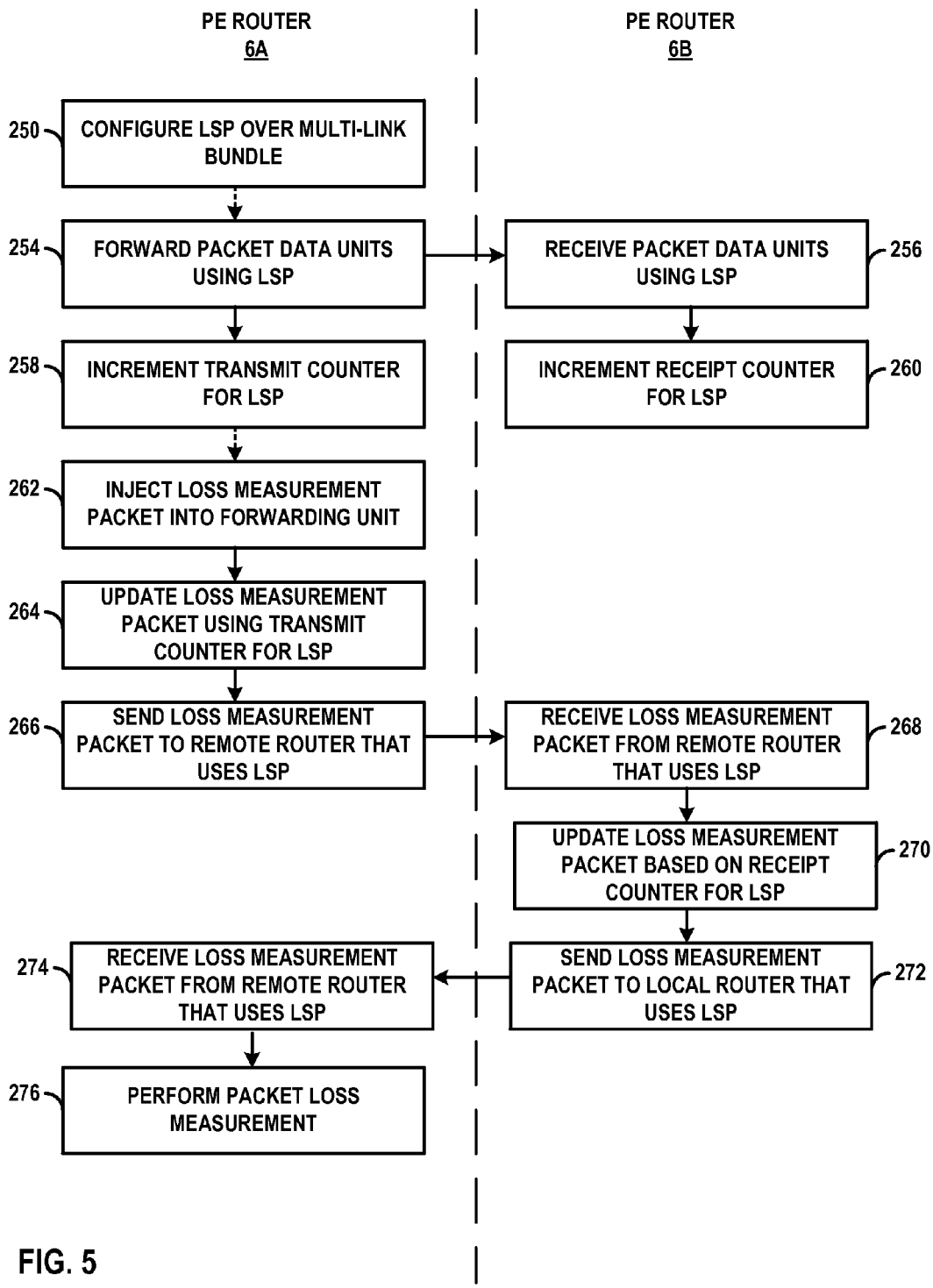
FIG. 5 is a flowchart that illustrates example operations of two PE routers of FIG. 1, for performing packet loss measurement, in accordance with techniques of the disclosure.

FIG. 5 is a flowchart that illustrates example operations of two PE routers, PE router 6A and PE router 6B of FIG. 1, which implement techniques for packet loss measurement in a distributed data plane, in accordance with techniques of the disclosure. While described with respect to PE router 6A and PE router 6B of FIG. 1, the techniques may be implemented by any type of network device capable of performing one or more functions of PE route r6A described in the disclosure.

Initially, PE router 6A may configure a virtual path over a multi-link bundle with PE router 6B as described in FIGS. 1-2 (250). For instance PE router 6A may send one or more control messages to PE router 6B. Each of PE routers 6A and 6B may each configure counters within forwarding units associated with the virtual path, wherein each of the respective forwarding units is associated is included in one of PE router 6A or PE router 6B.

PE router 6A may forward PDUs to PE router 6B using the virtual path (254). PE router 6B may receive the PDUs that were sent using the virtual path (256). As PE router 6A sends each respective PDU, the forwarding unit of PE router 6A that send the PDU increments the transmit counter of that forwarding unit (258). Similarly, as PE router 6B receive each respective PDU, the forwarding unit of PE router 6B that receives the PDU increments the receipt counter of that forwarding unit (260).

PE router 6A may initiate a packet loss measurement based on input from an administrator or as an automated or scheduled process. Upon generating a LMP with an appended internal header, as described in FIGS. 1-4, PE router 6A may inject the LMP into one of the forwarding units that forwards and receives PDUs using the virtual path (262). Upon receiving the LMP, the forwarding unit may update the LMP with the transmit counter value stored by the forwarding unit (264). PE router 6A may internally forward the LMP to each forwarding unit that is associated with the virtual path. Each forwarding unit may update the LMP to add its respective transmit counter value to the total transmit counter value stored in the LMP.

Once all of the forwarding units associated with the virtual path have updated the LMP, PE router 6A may forward the LMP to a remote router (e.g., PE router 6B) that uses the virtual path (266). PE router 6B may receive the LMP from PE router 6A. PE router 6B may update the LMP with receipt counters associated with the virtual path that are maintained by respective forwarding units of PE router 6B. That is, PE router 6B may update the LMP to include a total receipt counter value that indicates the total number of PDUs received by PE router 6B on the virtual path. PE router 6B may send the LMP to PE route 6A (272). PE router 6A may receive the LMP from PE router 6B (274). Upon receiving the LMP, PE router 6A may perform a loss measurement to determine the number of packets that were lost when sent from PE router 6A to PE router 6B using the virtual path.

Techniques of the disclosure may provide improved accuracy in loss measurement because counter values accumulated in the data plane or "fast path." Furthermore, any deviation from complete accuracy may be constant, since the number of hops may be fixed and/or there may be no wait times. Techniques of the disclosure may also be highly scalable, as any forwarding unit may initiate the loss measurement process in some examples.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Various embodiments of the invention have been described. These and other embodiments are within the scope of the following claims.

The invention claimed is:

1. A method comprising:
   switching, with a local router having a plurality of forwarding units interconnected by a switch fabric to implement a distributed data plane, layer two (L2) packet data units (PDUs) between the local router and a remote router using a virtual path, wherein the virtual path includes first and second links that operate as a single logical link to transmit the PDUs between the local router and the remote router, and wherein the first and second links are coupled to different, respective first and second forwarding units of the plurality of forwarding units;
   incrementing, by the first forwarding unit and in response to the first forwarding unit processing any PDU of the PDUs for the virtual path, a first counter, stored by the first forwarding unit and associated with the virtual path;
   incrementing, by the second forwarding unit and in response to the second forwarding unit processing any PDU of the PDUs for the virtual path, a second counter, stored by the second forwarding unit and associated with the virtual path;
   updating, by the first forwarding unit and based at least in part on a value of the first counter, a loss-measurement packet (LMP);
   internally forwarding, by the first forwarding unit via the switch fabric, the LMP to the second forwarding unit;
   updating, by the second forwarding unit and based at least in part on a value of the second counter, the LMP; and
   sending, with the local router, the LMP to the remote router.

2. The method of claim 1,
   wherein processing any PDU of the PDUs for the virtual path comprises at least one of forwarding any PDU of the PDUs using the virtual path, or receiving any PDU of the PDUs using the virtual path; and
   wherein the first counter and the second counter are each at least one of a transmit counter or a receipt counter.

3. The method of claim 1, further comprising:
   generating, by at least one of the first forwarding unit or a routing unit of the local router, the LMP; and
   adding an internal header to the LMP that indicates the first forwarding unit and the second forwarding unit are associated with the virtual path.

4. The method of claim 3, wherein the internal header comprises at least one of:
- an opcode that, when processed by the first forwarding unit, causes the first forwarding unit to update a total counter value included in the LMP with a first counter value of the first counter value;
- a counter identifier that identifies the virtual path; and
- a data structure that indicates each of the first forwarding unit and the second forwarding unit that are each associated with the virtual path.

5. The method of claim 4, further comprising:
determining, by the local router, a next hop identifier of the remote router that identifies the remote router; and
wherein the internal header comprises the next hop identifier, wherein sending the LMP comprising sending according to the next hop identifier.

6. The method of claim 4, further comprising:
modifying, by the first forwarding unit, the data structure to indicate that the first forwarding unit does not need to later update the LMP;
determining, by the first forwarding unit and based on the data structure, whether any of the plurality of forwarding units associated with the virtual path need to update the LMP.

7. The method of claim 6, further comprising:
responsive to determining, by the first forwarding unit and based on the data structure, that the second forwarding unit associated with the virtual path needs to update the LMP:
- determining, by the first forwarding unit and based on the data structure, the second forwarding unit that has not updated the LMP; and
- internally forwarding, by the first forwarding unit and using a switch fabric of the local router, the LMP to the second forwarding unit.

8. The method of claim 7, further comprising:
responsive to determining, by the second forwarding unit and based on the data structure, that a third forwarding unit does not need to update the LMP:
- removing, by the second forwarding unit, the internal header of the LMP;
- appending, by the second forwarding unit and based on the next hop identifier, an external header to the LMP; and
- forwarding, by the second forwarding unit, the LMP to the remote router.

9. The method of claim 4, further comprising:
configuring, by the local router, at least one respective counter at the first forwarding unit and the second forwarding unit that are each associated with the virtual path, wherein the first forwarding unit and the second forwarding unit respectively increment respective counters responsive to processing the PDUs; and
defining, by the local router, the counter identifier associated with the virtual path, wherein the counter identifier identifies the respective counters for the respective first forwarding unit and second forwarding unit associated with the virtual path.

10. The method of claim 4,
wherein the data structure is a bitmap comprising a plurality of bits, wherein each respective bit of the plurality of bits corresponds to a respective forwarding unit of the plurality of forwarding units of the local router;
wherein each bit of the plurality of bits that corresponds to a respective forwarding unit associated with the virtual path is set to 1, the respective forwarding unit included in the plurality of forwarding units; and
wherein each bit of the plurality of bits that corresponds to a respective forwarding unit that is not associated with the virtual path is set to 0, the respective forwarding unit included in the plurality of forwarding units.

11. The method of claim 10, further comprising:
prior to injecting the LMP into the first forwarding unit, determining, by the local router, a respective counter value of each respective forwarding unit associated with the virtual path of the plurality of respective forwarding units of the local router;
wherein each bit of the plurality of bits that corresponds to a respective forwarding unit that, is associated with the virtual path and includes a non-zero counter value for a counter associated with the virtual path, is set to 1, the respective forwarding unit included in the plurality of forwarding units; and
wherein each bit of the plurality of bits that corresponds to a respective forwarding unit that, is not associated with the virtual path or includes a zero counter value for a counter associated with the virtual path, is set to 0, the respective forwarding unit included in the plurality of forwarding units.

12. The method of claim 4, wherein updating the LMP further comprises:
determining, by the first forwarding unit of the local router and based on the counter identifier included in the internal header, a first counter value stored by the first forwarding unit; and
adding, by the first forwarding unit of the local router, the first counter value to a total counter value stored in the LMP.

13. The method of claim 12, further comprising:
receiving, by the local router and from the remote router, the LMP, wherein the LMP includes a first total counter value corresponding to the local router and a second total counter value corresponding to the remote router; and
performing, by the local router and based on the first and second total counter values, a packet loss measurement.

14. A local router comprising:
at least one processor;
a plurality of forwarding units comprising interconnected by a switch fabric to implement a distributed data plane, the plurality of forwarding unit comprising a first forwarding unit and a second forwarding unit;
wherein the first and second forwarding units switch layer two (L2) packet data units (PDUs) between the local router and a remote router using a virtual path, wherein the virtual path includes first and second links that operate as a single logical link to transmit the PDUs between the local router and the remote router, and wherein the first and second links are coupled to different, respective first and second forwarding units of the plurality of forwarding units;
wherein the first forwarding unit increments, in response to the first forwarding unit processing any PDU of the PDUs for the virtual path, a first counter, stored by the first forwarding unit and associated with the virtual path;
wherein the second forwarding unit increments, in response to the second forwarding unit processing any PDU of the PDUs for the virtual path, a second counter, stored by the second forwarding unit and associated with the virtual path;
wherein the first forwarding unit updates, based at least in part on a value of the first counter, a loss-measurement packet (LMP);

wherein the first forwarding unit internally forwards, via the switch fabric, the LMP to the second forwarding unit;

wherein the second forwarding unit updates, based at least in part on a value of the second counter, the LMP; and wherein the second forwarding unit sends the LMP to the remote router.

15. The local router of claim 14, wherein processing any PDU of the PDUs for the virtual path comprises at least one of forwarding any PDU of the PDUs using the virtual path, or receiving any PDU of the PDUs using the virtual path; and wherein the first counter and the second counter are each at least one of a transmit counter or a receipt counter.

16. The local router of claim 14, wherein at least one of the first forwarding unit or a routing unit of the local router generates the LMP; and wherein the at least one of the first forwarding unit or the routing unit adds an internal header to the LMP that indicates the first forwarding unit and the second forwarding unit are associated with the virtual path.

17. The local router of claim 16, wherein the internal header comprises at least one of:

an opcode that, when processed by the first forwarding unit, causes the first forwarding unit to update a total counter value included in the LMP with a first counter value of the first counter value;

a counter identifier that identifies the virtual path; and a data structure that indicates each of the first forwarding unit and the second forwarding unit that are each associated with the virtual path.

18. The local router of claim 17, wherein the at least one of the first forwarding unit or the routing unit determines a next hop identifier of the remote router that identifies the remote router; and wherein the internal header comprises the next hop identifier, wherein sending the LMP comprising sending according to the next hop identifier.

19. The local router of claim 17, wherein the first forwarding unit modifies the data structure to indicate that the first forwarding unit does not need to later update the LMP;

wherein the first forwarding unit determines, based on the data structure, whether any of the plurality of forwarding units associated with the virtual path need to update the LMP.

20. The local router of claim 19, wherein responsive to the first forwarding unit determining, based on the data structure, that the second forwarding unit associated with the virtual path needs to update the LMP:

the first forwarding unit determines, based on the data structure, the second forwarding unit that has not updated the LMP; and the first forwarding unit internally forwards, using a switch fabric of the local router, the LMP to the second forwarding unit.

21. The local router of claim 20, wherein responsive to determining, by the second forwarding unit and based on the data structure, that a third forwarding unit does not need to update the LMP, the second forwarding unit:

removes the internal header of the LMP;

appends, based on the next hop identifier, an external header to the LMP; and forwards the LMP to the remote router.

22. The local router of claim 17, wherein the local router:

configures at least one respective counter at the first forwarding unit and the second forwarding unit that are each associated with the virtual path, wherein the first forwarding unit and the second forwarding unit respectively increment respective counters responsive to processing the PDUs; and defines the counter identifier associated with the virtual path, wherein the counter identifier identifies the respective counters for the respective first forwarding unit and second forwarding unit associated with the virtual path.

23. The local router of claim 17, wherein the data structure is a bitmap comprising a plurality of bits, wherein each respective bit of the plurality of bits corresponds to a respective forwarding unit of the plurality of forwarding units of the local router;

wherein each bit of the plurality of bits that corresponds to a respective forwarding unit associated with the virtual path is set to 1, the respective forwarding unit included in the plurality of forwarding units; and wherein each bit of the plurality of bits that corresponds to a respective forwarding unit that is not associated with the virtual path is set to 0, the respective forwarding unit included in the plurality of forwarding units.

24. The local router of claim 17, prior to injecting the LMP into the first forwarding unit, the local router determines a respective counter value of each respective forwarding unit associated with the virtual path of the plurality of respective forwarding units of the local router;

wherein each bit of the plurality of bits that corresponds to a respective forwarding unit that, is associated with the virtual path and includes a non-zero counter value for a counter associated with the virtual path, is set to 1, the respective forwarding unit included in the plurality of forwarding units; and wherein each bit of the plurality of bits that corresponds to a respective forwarding unit that, is not associated with the virtual path or includes a zero counter value for a counter associated with the virtual path, is set to 0, the respective forwarding unit included in the plurality of forwarding units.

25. The local router of claim 17, wherein the first forwarding unit determines, based on the counter identifier included in the internal header, a first counter value stored by the first forwarding unit; and wherein the first forwarding unit adds the first counter value to a total counter value stored in the LMP.

26. The local router of claim 25, wherein the local router receives, from the remote router, the LMP, wherein the LMP includes a first total counter value corresponding to the local router and a second total counter value corresponding to the remote router; and wherein the local router performs, based on the first and second total counter values, a packet loss measurement.

27. A non-transitory computer-readable medium comprising instructions that cause at least one processor of a local router to:

switch, a plurality of forwarding units interconnected by a switch fabric to implement a distributed data plane, layer two (L2) packet data units (PDUs) between the local router and a remote router using a virtual path, wherein the virtual path includes first and second links that operate as a single logical link to transmit the PDUs between the local router and the remote router, and wherein the first and second links are coupled to different, respective first and second forwarding units of the plurality of forwarding units;

increment, by the first forwarding unit and in response to the first forwarding unit processing any PDU of the PDUs for the virtual path, a first counter, stored by the first forwarding unit and associated with the virtual path;

increment, by the second forwarding unit and in response to the second forwarding unit processing any PDU of the PDUs for the virtual path, a second counter, stored by the second forwarding unit and associated with the virtual path;

update, by the first forwarding unit and based at least in part on a value of the first counter, a loss-measurement packet (LMP);

internally forward, by the first forwarding unit via the switch fabric, the LMP to the second forwarding unit;

update, by the second forwarding unit and based at least in part on a value of the second counter, the LMP; and send, with the local router, the LMP to the remote router.

* * * * *